(12) United States Patent
Alstad et al.

(10) Patent No.: US 12,264,623 B1
(45) Date of Patent: Apr. 1, 2025

(54) SYSTEM FOR ELECTRIC MACHINE ASSOCIATED WITH GAS TURBINE ENGINE

(71) Applicant: HONEYWELL INTERNATIONAL INC., Charlotte, NC (US)

(72) Inventors: Shawn Alstad, Phoenix, AZ (US); Steven Henry Zysman, Phoenix, AZ (US); Jeffrey Guymon, Phoenix, AZ (US); Matthew Dunn, Phoenix, AZ (US); Tamim Jamal, Phoenix, AZ (US); Cristian Anghel, Tucson, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/416,200

(22) Filed: Jan. 18, 2024

(51) Int. Cl.
*F02C 6/20* (2006.01)
*F02C 7/16* (2006.01)

(52) U.S. Cl.
CPC ................. *F02C 6/20* (2013.01); *F02C 7/16* (2013.01); *F05D 2260/232* (2013.01)

(58) Field of Classification Search
USPC ..................................................... 415/123.1
See application file for complete search history.

(56) References Cited

U.S. PATENT DOCUMENTS

| | | | |
|---|---|---|---|
| 2,744,722 A | 5/1956 | Orr | |
| 2,826,895 A | 3/1958 | English | |
| 7,114,323 B2 | 10/2006 | Schlinker et al. | |
| 8,408,866 B2 | 4/2013 | Weaver et al. | |
| 8,833,053 B2 | 9/2014 | Chir et al. | |
| 9,097,134 B2 * | 8/2015 | Ferch | F01D 15/10 |
| 9,644,538 B2 | 5/2017 | Dionne | |
| 9,856,741 B2 | 1/2018 | Grant et al. | |
| 10,197,010 B2 | 2/2019 | Forsyth | |
| 10,801,410 B2 * | 10/2020 | Roberge | F01D 9/065 |
| 11,078,843 B2 * | 8/2021 | Roberge | F02C 6/06 |
| 11,384,649 B1 * | 7/2022 | Rambo | F01D 9/02 |
| 11,572,803 B1 | 2/2023 | Lacy et al. | |
| 11,821,370 B2 * | 11/2023 | Pal | F02C 7/18 |

(Continued)

FOREIGN PATENT DOCUMENTS

WO   WO-2023012419 A1 *   2/2023   ............. F01D 15/10

OTHER PUBLICATIONS

Translation WO-2023012419-A1 (Year: 2024).*

(Continued)

*Primary Examiner* — J. Todd Newton
(74) *Attorney, Agent, or Firm* — Lorenz & Kopf LLP

(57) ABSTRACT

A system for an electric machine associated with a gas turbine engine of a vehicle includes a shield to be coupled to the electric machine. The shield includes a first wall opposite a second wall with a passage defined between the first wall and the second wall. The first wall defines an inlet port at a first end opposite an outlet port defined between the first wall and the second wall at a second end. The inlet port and the outlet port are in communication with the passage. The system includes an airfoil coupled to the shield proximate the second end to extend from the shield. The airfoil defines an airfoil inlet at a leading edge that is in communication with an interior of the airfoil. The interior of the airfoil is in communication with the inlet port and is to couple the electric machine to the gas turbine engine.

19 Claims, 22 Drawing Sheets

(56) References Cited

U.S. PATENT DOCUMENTS

| | | | |
|---|---|---|---|
| 2012/0315141 A1 | 12/2012 | Udall | |
| 2013/0133336 A1* | 5/2013 | Barnett | F01D 25/04 |
| | | | 248/671 |
| 2016/0108757 A1* | 4/2016 | Mickelsen | F01D 25/28 |
| | | | 415/213.1 |
| 2016/0134171 A1* | 5/2016 | Davis | F16D 27/102 |
| | | | 310/78 |
| 2020/0290744 A1* | 9/2020 | Spierling | F01D 15/10 |
| 2021/0017879 A1* | 1/2021 | Banham | H02K 7/1823 |
| 2021/0222623 A1 | 7/2021 | Roberge | |
| 2021/0324799 A1* | 10/2021 | Suzuki | B64D 33/08 |
| 2022/0045573 A1* | 2/2022 | Seki | F02C 7/18 |
| 2022/0056810 A1* | 2/2022 | Grunwald | F01D 15/10 |
| 2022/0195887 A1 | 6/2022 | Hanczewski et al. | |

OTHER PUBLICATIONS

James Rushbrooke, Cooling Methods in Turbine Blades, Apr. 8, 2020.

Aeronautics Guide, Gas Turbine Engine Cooling System, Sep. 26, 2021.

NASDAQ, IHI Brings Planet Closer to a Carbon-Free Future by Developing World's First Aircraft Engine-Embedded Megawatt-Class Electric Motor, downloaded from https://www.nasdaq.com/press-release/ihi-brings-planet-closer-to-a-carbon-free-future-by-developing-worlds-first-aircraft on Jan. 15, 2024.

* cited by examiner

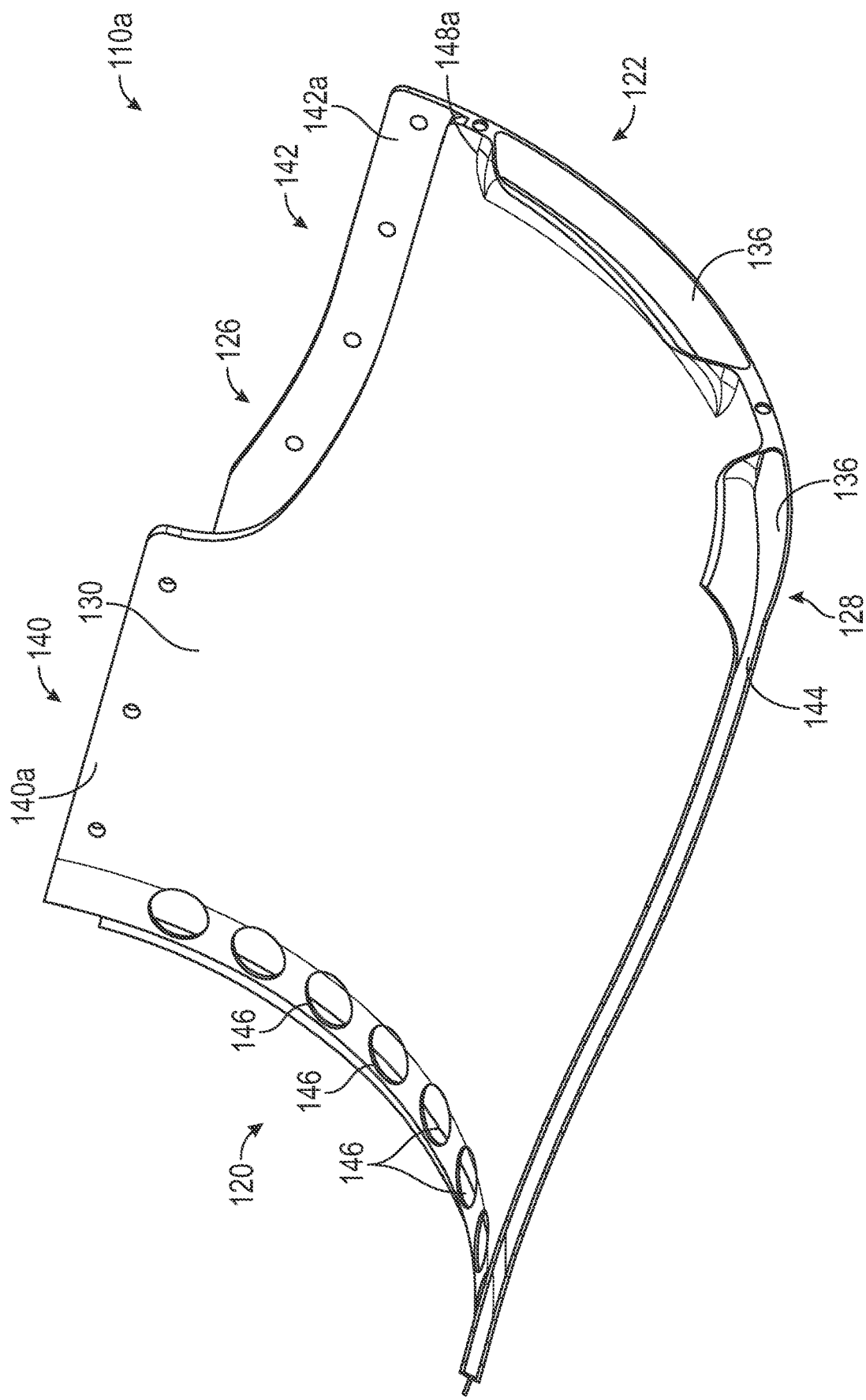

SYSTEM FOR ELECTRIC MACHINE ASSOCIATED WITH GAS TURBINE ENGINE

STATEMENT REGARDING FEDERALLY SPONSORED RESEARCH OR DEVELOPMENT

This invention was made with Government support under FA8650-17-F-2001, IDIQ: FA8650-15-D-2504-0001 awarded by Air Force Research Laboratory. The Government has certain rights in the invention.

TECHNICAL FIELD

The present disclosure generally relates to gas turbine engines, and more particularly relates to a system for an electric machine associated with a gas turbine engine.

BACKGROUND

In certain instances, vehicles may include an electric machine to produce electrical energy. In the example of a vehicle as a mobile platform, the vehicle may include a gas turbine engine and the electric machine may be contained within the gas turbine engine so as to be proximate the vehicle. In these instances, the electric machine may be exposed to hot gases produced during the operation of the gas turbine engine. In addition, various electrical components may be coupled to the electric machine, which may also be exposed to the hot gases produced by the gas turbine engine.

Accordingly, it is desirable to provide a system for an electric machine associated with a gas turbine engine, which provides cooling to the electric machine and electrical components associated with the electric machine during the operation of the gas turbine engine. Furthermore, other desirable features and characteristics of the present disclosure will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

According to various embodiments, provided is a system for an electric machine associated with a gas turbine engine of a vehicle. The system includes a shield configured to be coupled to the electric machine. The shield includes a first wall opposite a second wall with a flow passage defined between the first wall and the second wall. The first wall defines an inlet port at a first end that is opposite an outlet port defined between the first wall and the second wall at a second end. The inlet port and the outlet port are in fluid communication with the flow passage. The system includes an airfoil coupled to the shield proximate the second end to extend radially from the shield. The airfoil defines an airfoil inlet at a leading edge that is in fluid communication with an interior of the airfoil. The interior of the airfoil is in fluid communication with the inlet port and the interior of the airfoil is configured to couple the electric machine to the gas turbine engine.

The interior of the airfoil is configured to receive an aerodynamic support to couple the electric machine to the gas turbine engine. The aerodynamic support is positioned within the interior of the airfoil proximate the leading edge such that an opening included in the aerodynamic support is aligned with the airfoil inlet. The opening includes a turning vane that is configured to direct a cooling fluid flow from the airfoil inlet through the aerodynamic support and to redirect the cooling fluid flow radially toward the flow passage. The opening includes a splitter that intersects the turning vane. The aerodynamic support is a turnbuckle that includes the opening. The airfoil includes a conduit that is configured to receive an electrical component associated with the electric machine and the electric machine is oil cooled. The conduit includes a slot configured to receive a cooling fluid flow from the airfoil inlet to cool the electrical component. The shield is configured to be coupled to the electric machine to define a first flow passage, and the first flow passage is in fluid communication with the interior of the airfoil and the inlet port. The outlet port comprises a diffusion outlet port. The outlet port comprises a plurality of bores. The system includes an aft bulkhead coupled to the second end of the shield and configured to inhibit a flow of a cooling fluid toward the second end of the shield. The system includes a centerbody coupled to the second end of the shield, and the centerbody is in fluid communication with the outlet port.

Also provided is a vehicle. The vehicle includes a gas turbine engine that extends along a longitudinal axis. The gas turbine engine includes a mixer lobe configured to mix a cooling fluid with exhaust gases. The system includes an electric machine coupled to the gas turbine engine by a system so as to extend along the longitudinal axis. The system includes a shield coupled to the electric machine to define a first flow passage. The shield includes a first wall opposite a second wall with a second flow passage defined between the first wall and the second wall, and the first flow passage in fluid communication with the second flow passage. The system includes an airfoil coupled to the shield that defines an airfoil inlet at a leading edge that is in fluid communication with an interior of the airfoil. The interior of the airfoil is in fluid communication with the first flow passage and the interior of the airfoil is configured to couple the electric machine to the gas turbine engine.

The shield further comprises an inlet port at a first end and an outlet port defined between the first wall and the second wall at a second end, the second end opposite the first end and the airfoil is coupled to the shield proximate the second end. The mixer lobe includes a plurality of crests and a plurality of troughs that alternate about a perimeter of the mixer lobe, and the airfoil is positioned between a pair of crests of the plurality of crests and is aligned with a trough of the plurality of troughs to receive the cooling fluid at the airfoil inlet. The vehicle includes an aerodynamic support received within the interior of the airfoil proximate the leading edge. The aerodynamic support is configured to couple the electric machine to the gas turbine engine, the electric machine is oil cooled, and the aerodynamic support includes an opening that is aligned with the airfoil inlet and configured to allow the cooling fluid to pass through the aerodynamic support into the interior of the airfoil. The airfoil includes a conduit that is configured to receive an electrical component associated with the electric machine and the conduit is spaced apart from the leading edge. The outlet port comprises a diffusion outlet port or a plurality of bores. The vehicle includes an aft bulkhead coupled to the second end of the shield and configured to direct the cooling fluid toward the first end of the shield.

BRIEF DESCRIPTION OF DRAWINGS

The present disclosure will hereinafter be described in conjunction with the following drawing figures, wherein like numerals denote like elements, and wherein:

FIG. 5 is a cross-sectional view of a shield associated with the system taken along line 5-5 of FIG. 4;

DETAILED DESCRIPTION

Figure 1:
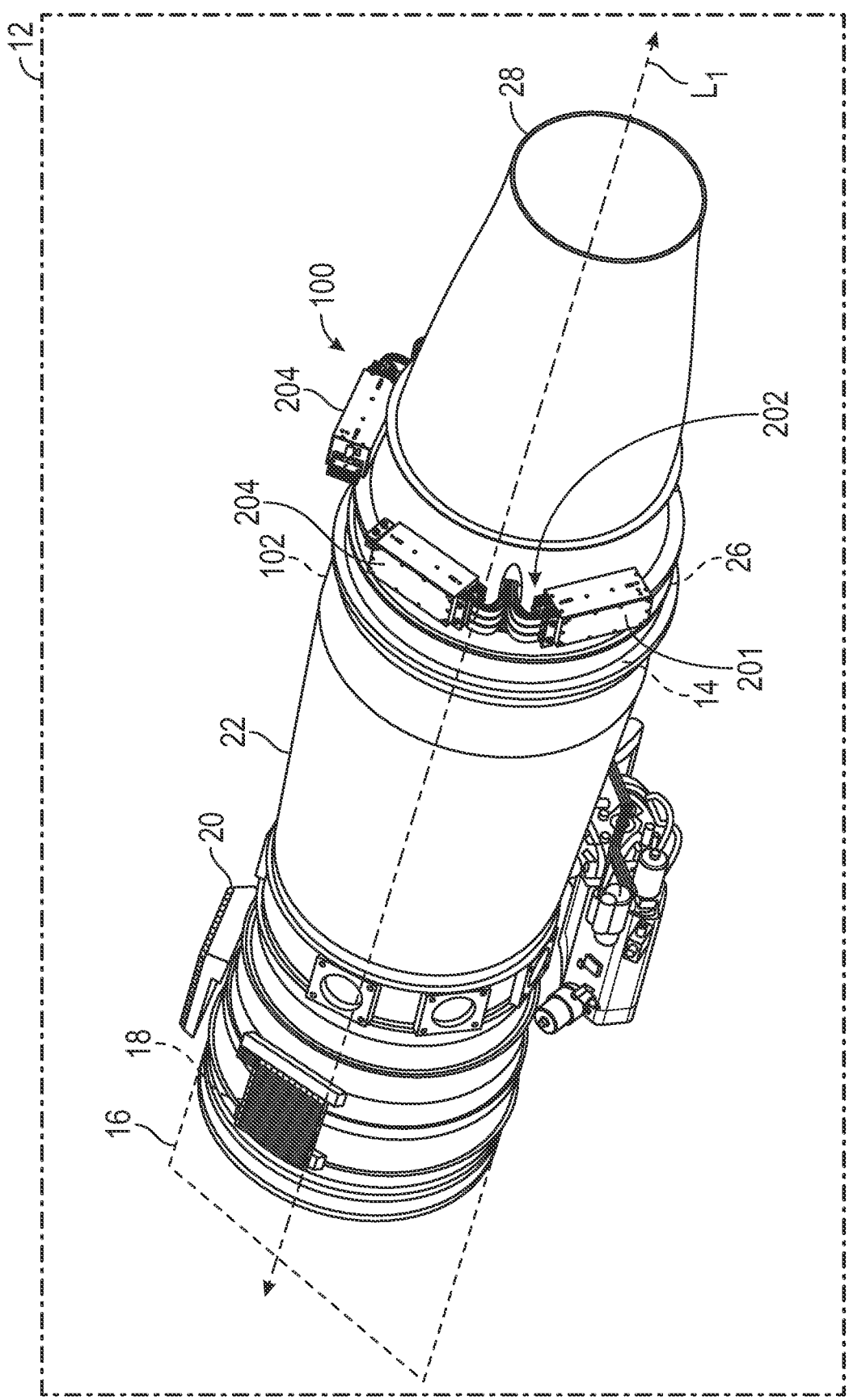
FIG. 1 is a schematic cross-sectional illustration of a gas turbine engine associated with a vehicle, which includes an exemplary system for an electric machine in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of arrangement that would benefit from the system described herein and the use of the system for an electric machine associated with a gas turbine engine described herein is merely one exemplary embodiment according to the present disclosure. In addition, while the system is described herein as being used with an electric machine onboard a mobile platform, such as a bus, motorcycle, train, motor vehicle, marine vessel, aircraft, and the like, the various teachings of the present disclosure can be used with an electric machine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

With reference to FIG. 1, a schematic view of an exemplary system 100 for use with an electric machine 102 associated with a gas turbine engine 10 of a vehicle 12, such as an aircraft, unmanned aerial vehicle, etc. is shown. In one example, the electric machine 102 is coupled or mounted in line with the gas turbine engine 10 such that the electric machine 102 and the gas turbine engine 10 extend along a longitudinal axis L. The longitudinal axis L is also an axis of rotation for the gas turbine engine 10. In this example, the system 100 mounts the electric machine 102 to the gas turbine engine 10 such that the electric machine 102 is behind the gas turbine engine 10 or downstream from an exhaust section 14 associated with the gas turbine engine 10. As will be discussed, the system 100 assists in reducing a local ambient temperature about the electric machine 102, while also providing for the mounting of the electric machine 102 to the gas turbine engine 10 and routing of electrical and/or cooling components associated with the electric machine 102.

The electric machine 102 includes, but is not limited to, a generator or a motor. In one example, the electric machine 102 is fluidically cooled, including, but not limited to, oil cooled, and the system 100 provides for a local reduction in temperature around or about the electric machine 102, which enables the fluid or oil cooling of the electric machine 102 to cool the electric machine 102 and associated components. Stated another way, due to the temperature of core gas flow, additional cooling besides fluid or oil cooling may be necessary to sufficiently cool the electric machine 102. The system 100 cooperates with the fluid or oil cooling of the electric machine 102 to ensure that the electric machine 102 is sufficiently cooled. It should be noted that in certain examples, due to the electrical capacity of the electric machine 102, for example, the electric machine 102 may just include the system 100 to provide cooling for the electric machine 102. In addition, in the example where the electric machine 102 is a motor, one or more inverters may be employed to use electrical energy stored in one or more batteries, for example, as the electric machine 102 adds torque into a shaft associated with the gas turbine engine 10.

Figure 2:
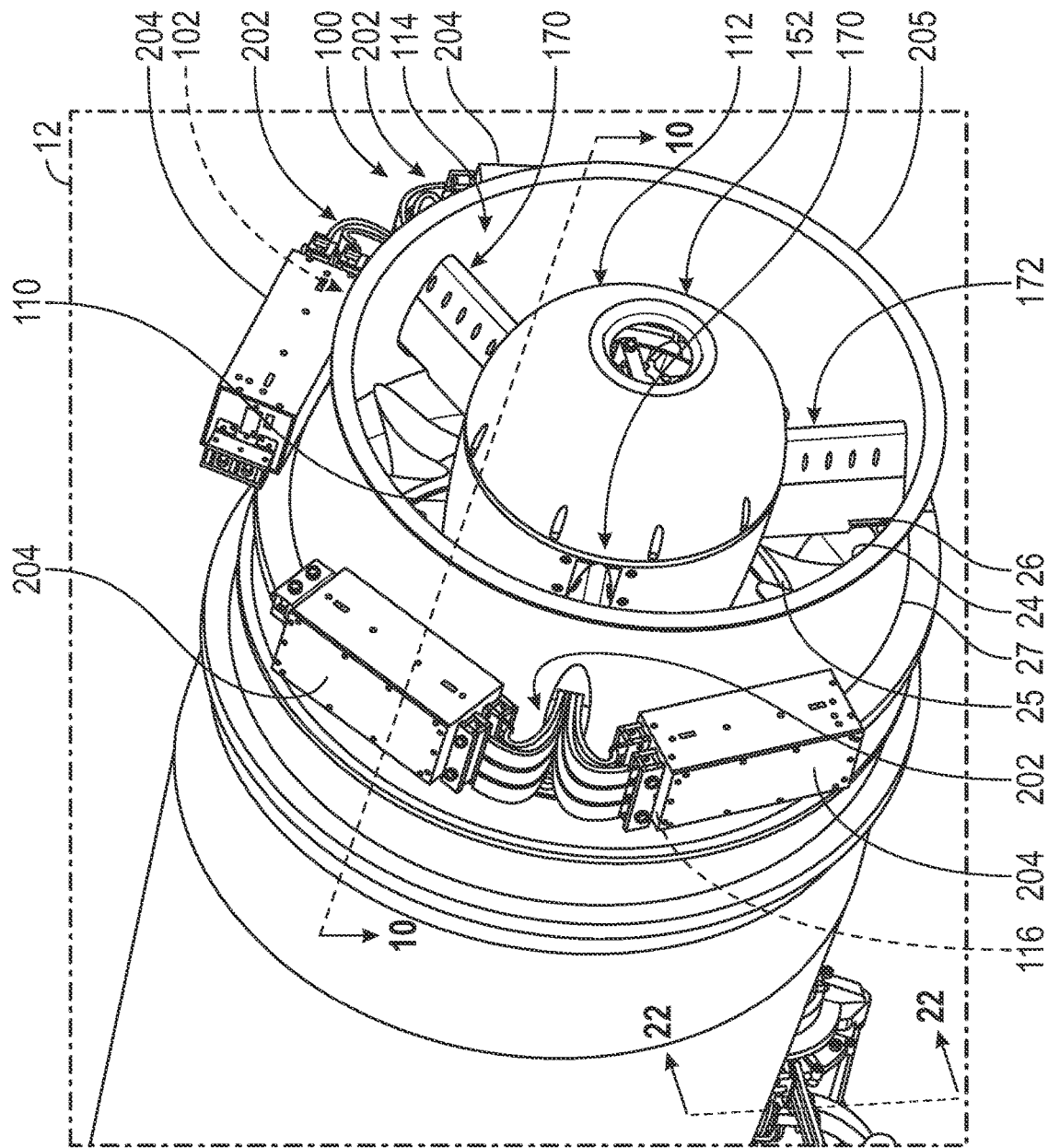
FIG. 2 is a perspective aft view of a portion of the gas turbine engine, the system and the electric machine, in which a tailpipe associated with the gas turbine engine has been removed for clarity.

Briefly, the gas turbine engine 10 includes a fan section 16, a compressor section 18, a combustor section 20, the turbine section 22, and the exhaust section 14. The fan section 16 includes a fan mounted on a rotor that draws air into the gas turbine engine 10 and accelerates it. A fraction of the accelerated air exhausted from the fan is directed through an outer (or first) bypass duct 24 (FIG. 2) and the remaining fraction of air exhausted from the fan is directed into the compressor section 18. The outer bypass duct 24 is generally defined between an inner bypass duct 25 and an outer casing 27 (FIG. 2). The compressor section 18 sequentially raises the pressure of the air and directs a majority of the high-pressure air into the combustor section 20. A fraction of the compressed air bypasses the combustor section 20 and is used to cool, among other components, electrical components associated with the electric machine 102 and the electric machine 102 itself.

In the combustor section 20, the high-pressure air is mixed with fuel, which is combusted to form the core gas flow. The core gas flow is directed into the turbine section 22. The high-temperature air from the combustor section 20 expands through and rotates each turbine in the turbine section 22. As the turbines rotate, each drives equipment in the gas turbine engine 10 via concentrically disposed shafts or spools. From the turbine section 22, the hot gases flow into the exhaust section 14 where a mixer lobe 26 (FIG. 2) mixes the core gas flow with the cooler bypass flow from the outer bypass duct 24 (FIG. 2) prior to exiting the vehicle at a tailpipe 28.

Figure 3:
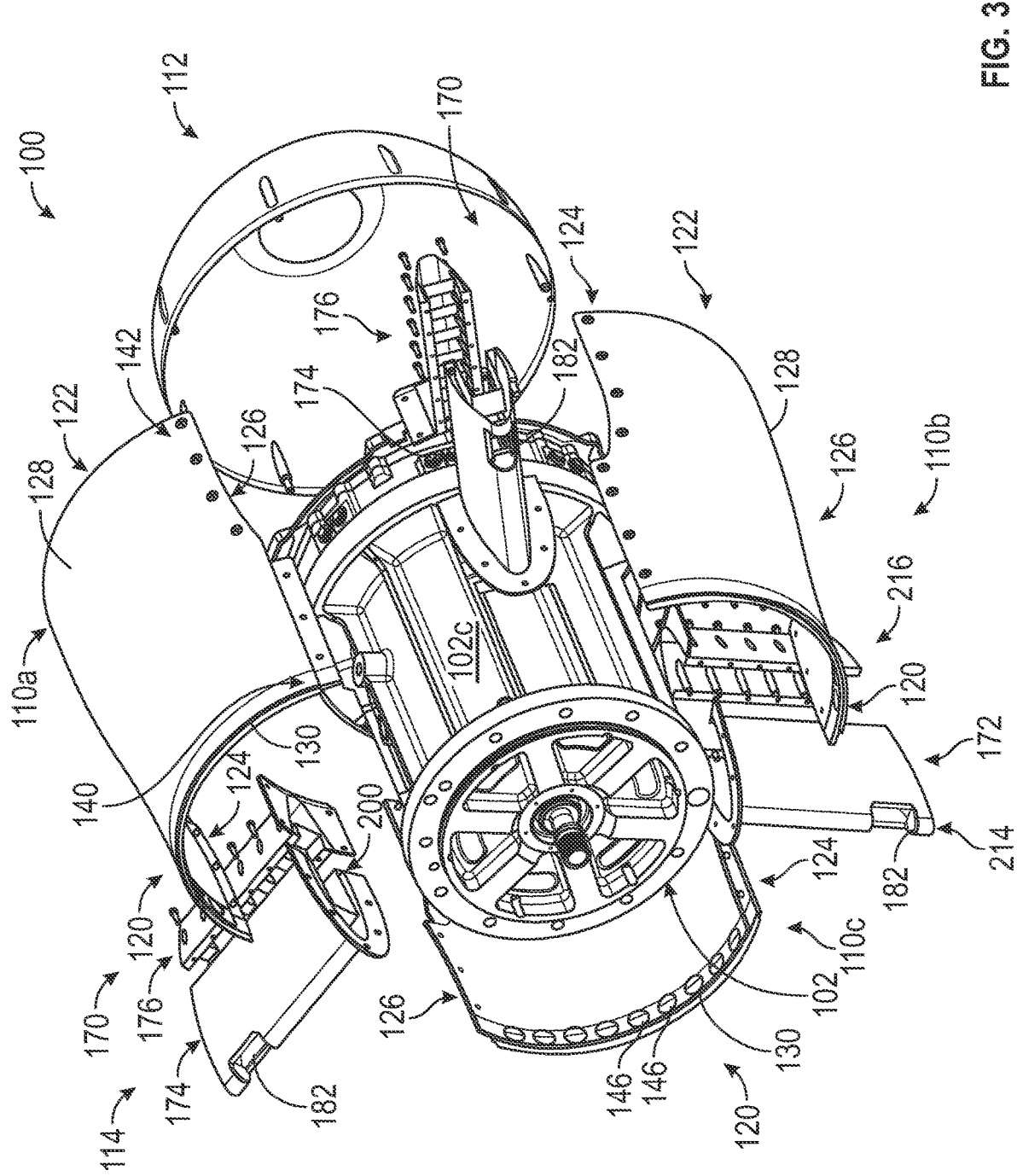
FIG. 3 is a forward perspective view of a portion of the system exploded from the electric machine.
Figure 4:
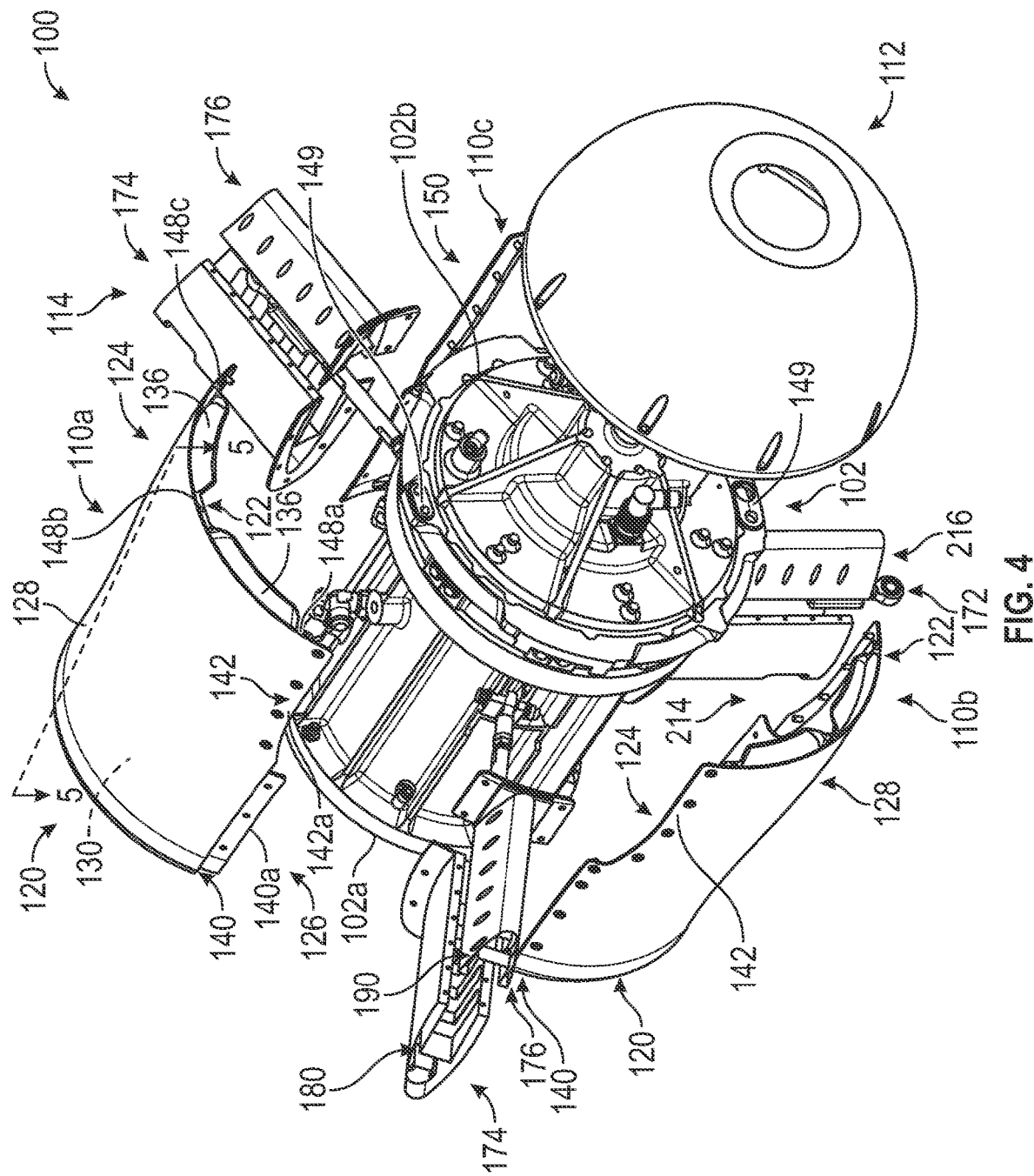
FIG. 4 is an aft perspective view of the portion of the system exploded from the electric machine.

With reference to FIG. 2, a perspective view of the system 100 for coupling the electric machine 102 to the gas turbine engine 10 is shown. In FIG. 2, the tailpipe 28 is not shown for clarity. In one example, the system 100 includes at least one shield 110, an aft assembly 112, at least one airfoil 114 and at least one aerodynamic support 116. The at least one shield 110, the aft assembly 112, the at least one airfoil 114 and the at least one aerodynamic support 116 cooperate to provide cooling to the electric machine 102, while coupling the electric machine 102 to the gas turbine engine 10. With reference to FIGS. 3 and 4, the at least one shield 110, the aft assembly 112 and the at least one airfoil 114 are shown exploded from the electric machine 102. In FIGS. 3 and 4, the at least one aerodynamic support 116 and the electrical components associated with the electric machine 102 are not shown for clarity. In this example, the at least one shield 110 includes three shields 110a, 110b, 110c, which cooperate to substantially enclose a perimeter 102c of the electric machine 102. Each of the shields 110a-110c may be composed of a metal or metal alloy, and may be cast, forged, additively manufactured, etc. Each of the shields 110a-110c is curved or contoured to correspond to the shape of the electric machine 102. Each of the shields 110a-110c includes a first shield end 120 opposite a second shield end 122, a first shield side 124 opposite a second shield side 126, and a first shield wall 128 opposite a second shield wall 130. As will be discussed, with brief reference to FIG. 6, the shields 110a-110c are coupled to the electric machine 102 to define a first fluid passage 131 between the respective shields 110a-110c and a perimeter 102c of the electric machine 102.

With reference to FIGS. 3 and 4, the first shield end 120 is a forward end in a direction of working fluid flow through the gas turbine engine 10, and is coupled to a forward end 102a of the electric machine 102. In one example, the first shield end 120 includes a first lip 132, which extends along a perimeter of the first shield end 120. With reference to FIG. 6, the first lip 132 is coupled to or interfaces with a lip 134a of an exit guide vane 134 associated with the turbine section 22. With reference back to FIGS. 4 and 5, the second shield end 122 is an aft end, and is coupled to an aft end 102b of the electric machine 102. In one example, the second shield end 122 includes at least one outlet port 136. In this example, the second shield end 122 includes two outlet ports 136, however, in other examples, the second shield end 122 may include a single outlet port 136 or additional outlet ports 136. The outlet ports 136 are each diffusion outlet ports, which reduce a velocity of a cooling fluid, such as air, while increasing the pressure of the cooling fluid as the cooling fluid exits the shields 110a-110c and flows into a portion of the aft assembly 112. Generally, each of the outlet ports 136 has a cross-sectional area at an inlet of the outlet port 136 that is different and less than a cross-sectional area of an outlet of the outlet port 136 to diffuse the cooling fluid. By reducing the velocity of the cooling fluid, losses from drag are reduced. The second shield end 122 may also include a plurality of coupling flanges 148. In this example, the second shield end 122 includes three coupling flanges 148a, 148b, 148c, which each define at least one bore. The at least one bore associated with the coupling flanges 148a-148c receives a mechanical fastener to couple the respective shield 110a-110c to a portion of the aft assembly 112. The coupling flanges 148a-148c are spaced apart by the outlet ports 136. In this example, the coupling flanges 148a, 148c may be smaller than the coupling flange 148b due to the shape of the second shield end 122 of the shield 110a-110c.

With reference to FIGS. 3 and 4, the first shield side 124 and the second shield side 126 include a first coupling portion 140 at the first shield end 120 and a second coupling portion 142 at the second shield end 122. The first coupling portion 140 includes a flange 140a, which extends axially from each of the first shield side 124 and the second shield side 126. The flange 140*a* of the first shield side 124 cooperates with the flange 140*a* of the second shield side 126 of the adjacent shield 110*a*-110*c* to create an overlap between the shields 110*a*-110*c*, which couples the shields 110*a*-110*c* about the perimeter of the electric machine 102. Similarly, the flange 140*a* of the second shield side 126 cooperates with the flange 140*a* of the first shield side 124 of the adjacent shield 110*a*-110*c* to create the overlap between the shields 110*a*-110*c* to couple the shields 110*a*-110*c* about the perimeter of the electric machine 102. The flange 140*a* defines a plurality of fastener bores to receive a respective mechanical fastener to couple adjacent shields 110*a*-110*c* together. The second coupling portion 142 defines a relief 142*a*, which is configured to conform to a shape of the at least one airfoil 114 to enable a portion of the at least one airfoil 114 to be received between the shields 110*a*-110*c* and the electric machine 102 to couple the at least one airfoil 114 to the shields 110*a*-110*c*. Generally, adjacent reliefs 142*a* cooperate to define an opening that is shaped to receive a portion of the at least one airfoil 114 to couple the at least one airfoil 114 to the shields 110*a*-110*c*. The at least one airfoil 114 extends radially from the shields 110*a*-110*c*. Adjacent to the relief 142*a*, a plurality of fastener bores is defined to receive a respective mechanical fastener to couple the at least one airfoil 114 to the respective shield 110*a*-110*c*.

Figure 5A:
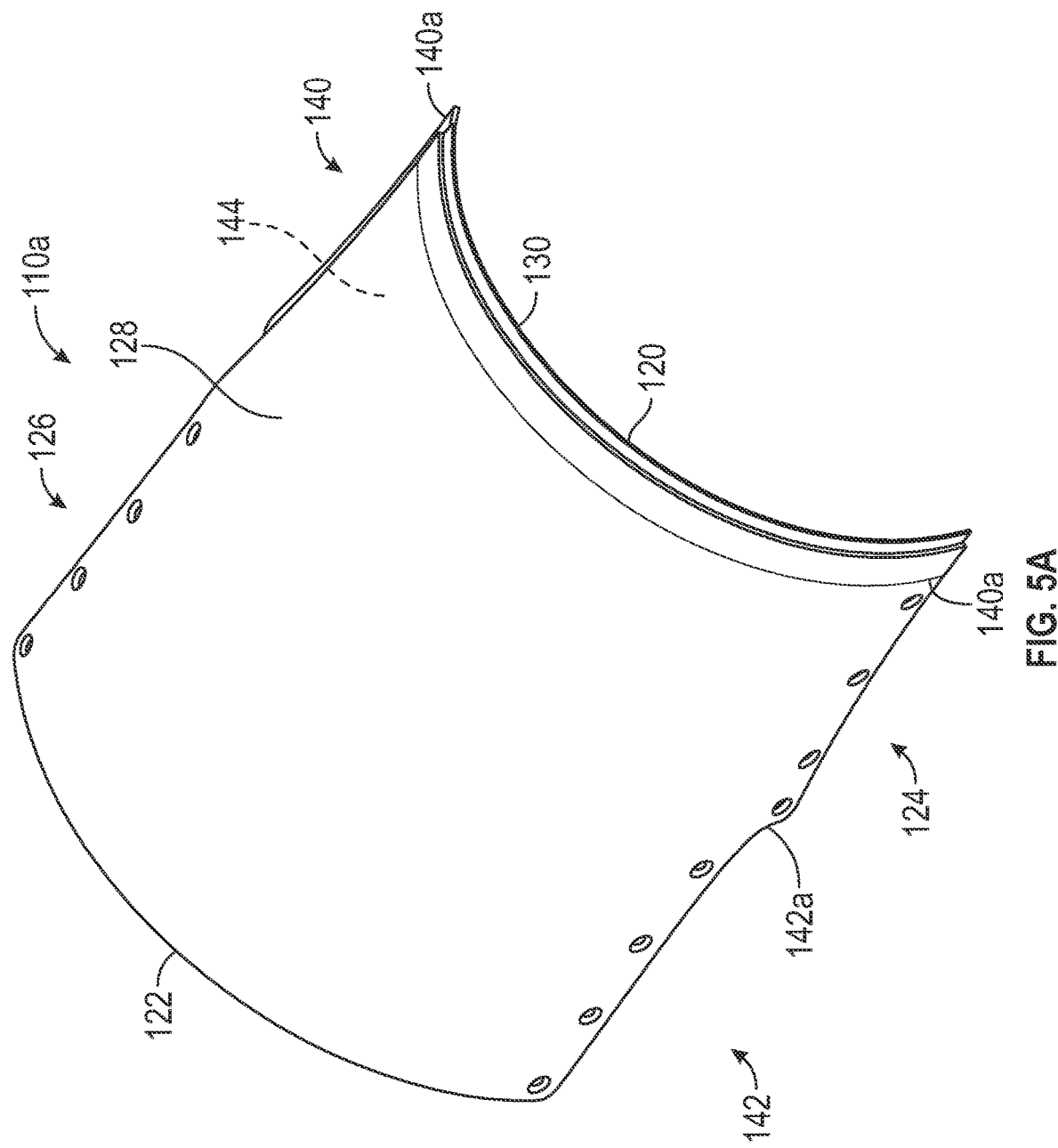
FIG. 5A is a forward perspective view of the shield associated with the system.
Figure 6:
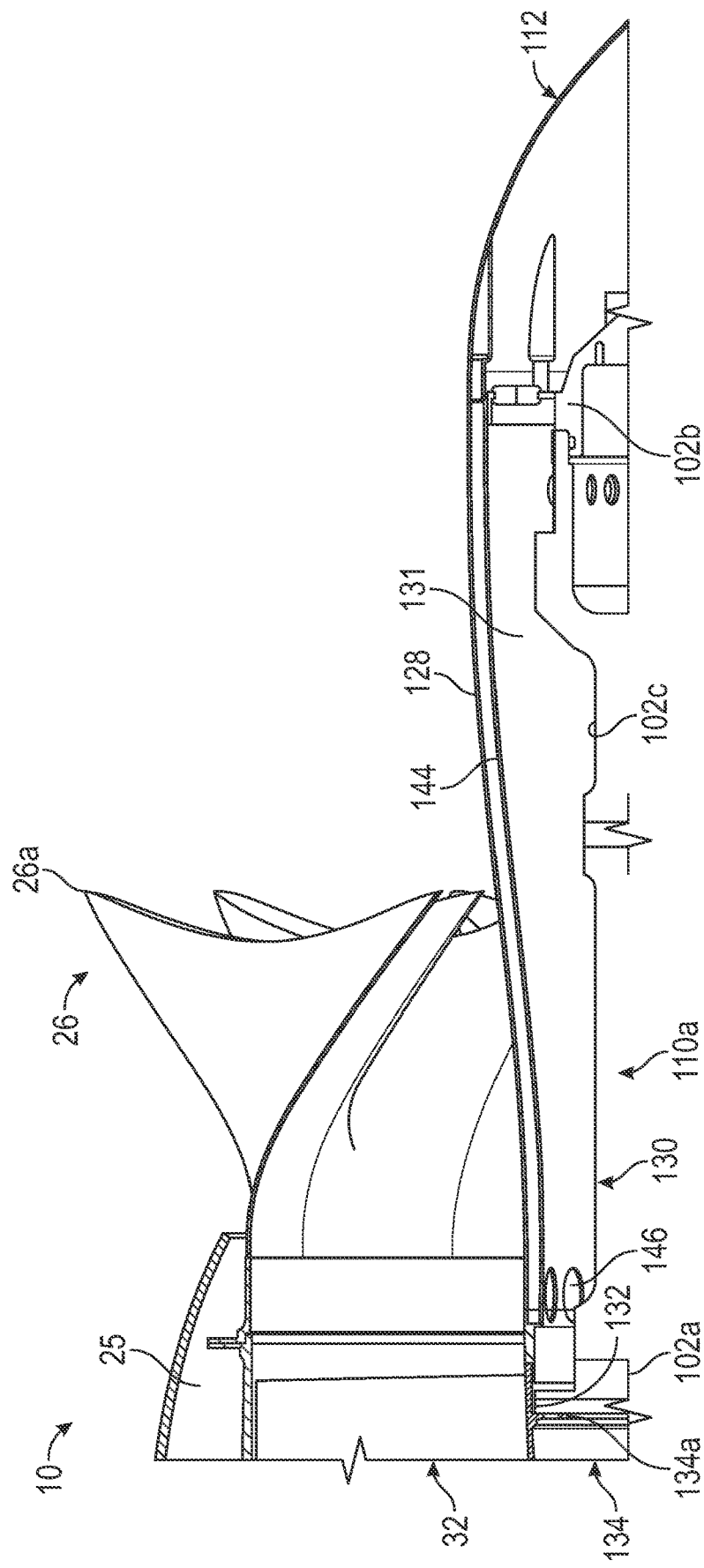
FIG. 6 is a cross-sectional view of a portion of the system and the gas turbine engine taken along line 10-10 of FIG. 2.

With reference to FIGS. 5 and 5A, the shield 110*a* is shown in greater detail. As each of the shields 110*a*-110*c* are the same, the following description is also applicable to the shields 110*b*, 110*c* and the same reference numerals will be used to denote the same components. Each of the shields 110*a*-110*c* is double walled, with the first shield wall 128 comprising a first outward surface of the respective shield 110*a*-110*c*, and the second shield wall 130 comprising a second inward surface of the respective shield 110*a*-110*c*. The first shield wall 128 is spaced apart from the second shield wall 130 to define a second fluid passage 144. The second fluid passage 144 extends from the first shield end 120 to the outlet ports 136 at the second shield end 122. It should be noted that the at least one airfoil 114 is coupled to the respective shield 110*a*-110*c* so as to not be in fluid communication with or to be fluidly isolated from the second fluid passage 144.

The first shield wall 128 is substantially smooth and is contoured to comport with the shape of the electric machine 102 and to assist in directing exhaust flow from the turbine section 22 over the electric machine 102. With reference to FIG. 5, the second shield wall 130 defines a plurality of inlet ports 146. The inlet ports 146 are defined through the second shield wall 130 substantially proximate or at the first shield end 120. The inlet ports 146 are defined so as to be spaced apart along the second shield wall 130 from the first shield side 124 to the second shield side 126. The inlet ports 146 are in fluid communication with the first fluid passage 131 (FIG. 6).

Figure 7:
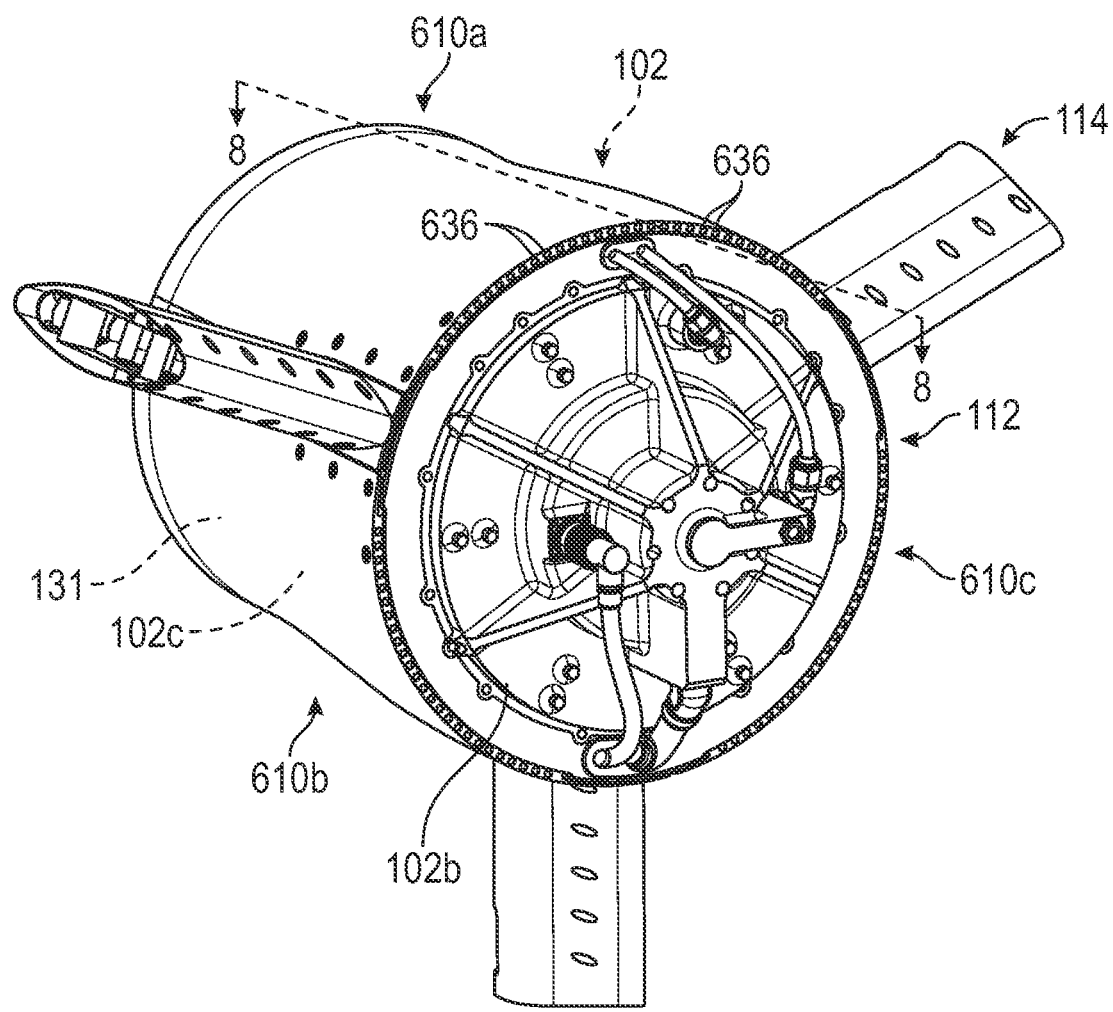
FIG. 7 is an aft view of another exemplary plurality of shields for use with the system, which are coupled to the electric machine, in accordance with various embodiments.
Figure 8:
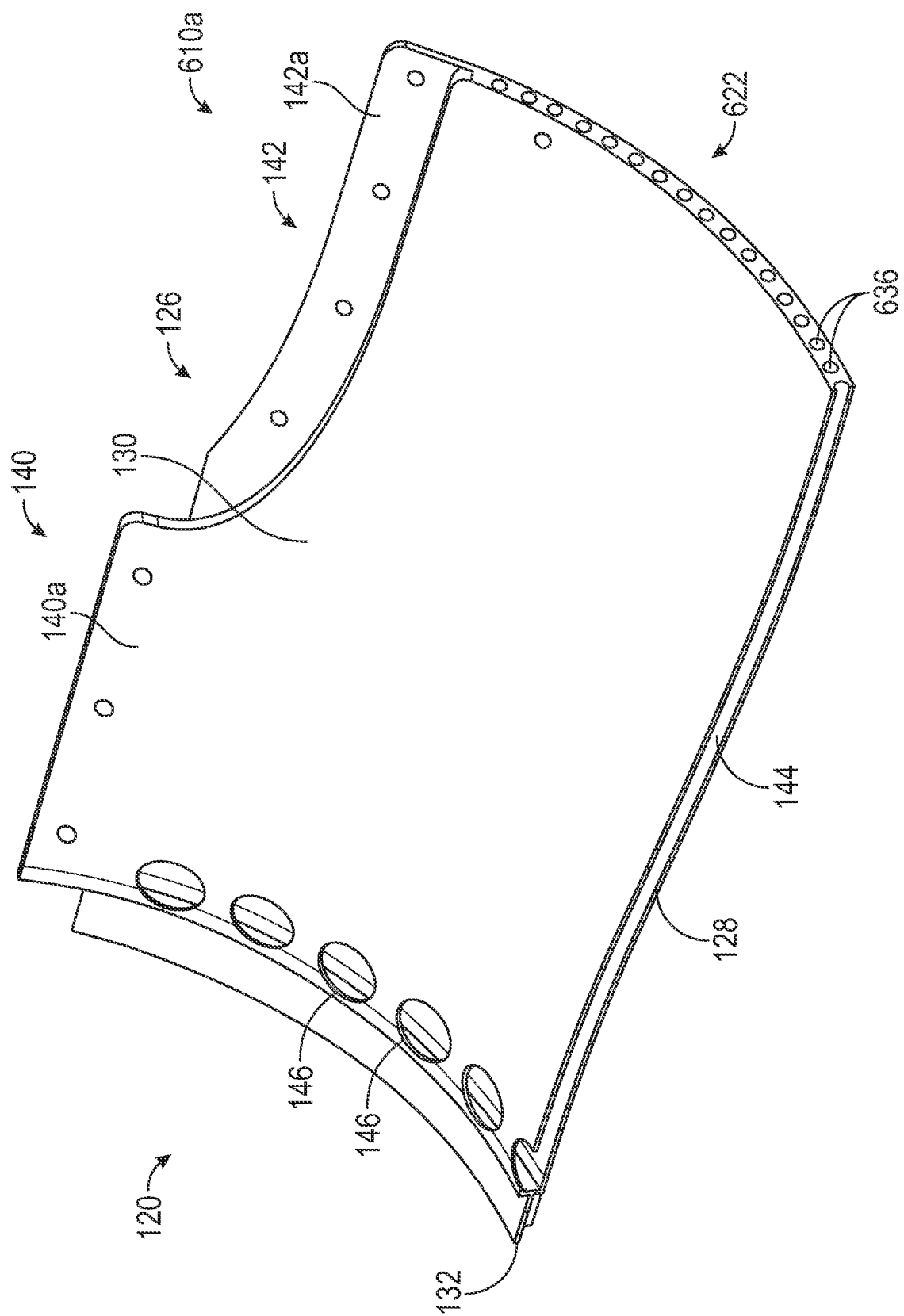
FIG. 8 is a cross-sectional view of one of the shields associated with the system of FIG. 7 taken along line 8-8 of FIG. 7.

It should be noted that while each of the shields 110*a*-110*c* is described herein as including the two diffusion outlet ports 136 to direct the cooling fluid into the aft assembly 112, the shields 110*a*-110*c* may be configured differently to direct the cooling fluid into the aft assembly 112. In one example, with reference to FIG. 7, the electric machine 102 is shown with shields 610*a*-610*c* and the at least one airfoil 114, and with a portion of the aft assembly 112 removed. As the shields 610*a*-610*c* include components that are the same or similar to components of the shields 110*a*-110*c* discussed with regard to FIGS. 1-6, the same reference numerals will be used to denote the same or similar components. In one example, the shields 610*a*-610*c*, the aft assembly 112, the at least one airfoil 114 and the at least one aerodynamic support 116 cooperate to provide cooling to the electric machine 102, while assisting in coupling the electric machine 102 to the gas turbine engine 10 (FIG. 1). The shields 610*a*-610*c* cooperate to substantially enclose the perimeter 102*c* of the electric machine 102. Each of the shields 610*a*-610*c* may be composed of a metal or metal alloy, and may be cast, forged, additively manufactured, etc. Each of the shields 610*a*-610*c* is curved or contoured to correspond to the shape of the electric machine 102. With additional reference to FIG. 8, each of the shields 610*a*-610*c* includes the first shield end 120 opposite a second shield end 622, the first shield side 124 opposite the second shield side 126, and the first shield wall 128 opposite the second shield wall 130. In FIG. 8, the shield 610*a* is shown in greater detail. As each of the shields 610*a*-610*c* are the same, the following description is also applicable to the shields 610*b*, 610*c* and the same reference numerals will be used to denote the same components. The shields 610*a*-610*c* are coupled to the electric machine 102 to define the first fluid passage 131 between the respective shields 610*a*-610*c* and the perimeter 102*c* of the electric machine 102.

The first shield end 120 includes the first lip 132, which extends along the perimeter of the first shield end 120. The second shield end 622 is an aft end, and is coupled to an aft end 102*b* of the electric machine 102. In one example, the second shield end 622 includes at least one outlet port 636. In this example, the second shield end 622 includes a plurality of outlet ports 636. The outlet ports 636 are each holes or slots, which direct the cooling fluid into the aft assembly 112. One or more of the outlet ports 636 may also receive a mechanical fastener to couple the respective shield 610*a*-610*c* to a portion of the aft assembly 112.

The first shield side 124 and the second shield side 126 include the first coupling portion 140 at the first shield end 120 and the second coupling portion 142 at the second shield end 620. The first coupling portion 140 includes the flange 140*a*, which cooperates with the flange 140*a* of the second shield side 126 of the adjacent shield 610*a*-610*c* to couple the shields 610*a*-610*c* about the perimeter of the electric machine 102. Similarly, the flange 140*a* of the second shield side 126 cooperates with the flange 140*a* of the first shield side 124 of the adjacent shield 610*a*-610*c* to couple the shields 610*a*-610*c* about the perimeter of the electric machine 102. The second coupling portion 142 defines the relief 142*a*, which is configured to conform to the shape of the at least one airfoil 114 to enable a portion of the at least one airfoil 114 to be received between the shields 610*a*-610*c* and the electric machine 102 to couple the at least one airfoil 114 to the shields 610*a*-610*c*. The at least one airfoil 114 extends radially from the shields 610*a*-610*c*.

Each of the shields 610*a*-610*c* is double walled, with the first shield wall 128 spaced apart from the second shield wall 130 to define the second fluid passage 144. The second fluid passage 144 extends from the first shield end 120 to the outlet ports 636 at the second shield end 622. It should be noted that the at least one airfoil 114 is coupled to the respective shield 610*a*-610*c* so as to not be in fluid communication with or to be fluidly isolated from the second fluid passage 144. The first shield wall 128 assists in directing exhaust flow from the turbine section 22 over the electric machine 102. The second shield wall 130 defines the plurality of inlet ports 146 substantially proximate or at the first shield end 120. The inlet ports 146 are defined so as to be spaced apart along the second shield wall 130 from the first shield side 124 to the second shield side 126.

With reference back to FIGS. 3 and 4, the aft assembly 112 substantially encloses the electric machine 102. In one example, the aft assembly 112 includes an aft bulkhead 150 and a centerbody 152. In certain examples, the aft bulkhead 150 may be integrally formed with the electric machine 102, or may be formed separately and coupled to the electric machine 102 via mechanical fasteners, welding, etc. The aft bulkhead 150 is coupled to the aft end 102b of the electric machine 102. The aft bulkhead 150 is substantially annular, and extends radially from the aft end 102b of the electric machine 102 and is coupled to the second shield end 122, 622 of the shields 110a-110c, 610a-610c.

Figure 9:
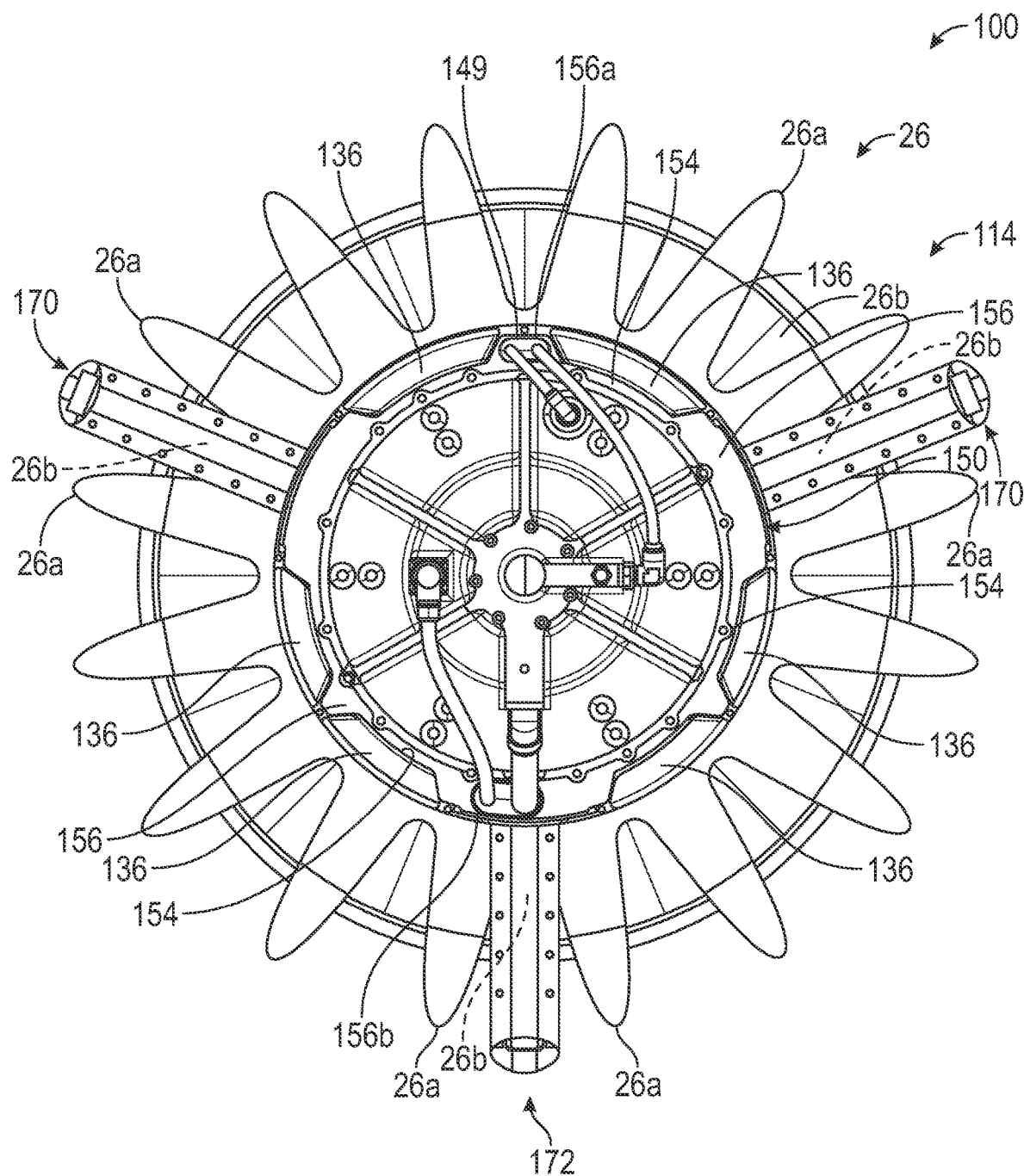
FIG. 9 is an aft view of the system including the shields of FIG. 5 coupled to the electric machine and positioned relative to a mixer lobe of the gas turbine engine.
Figure 10:
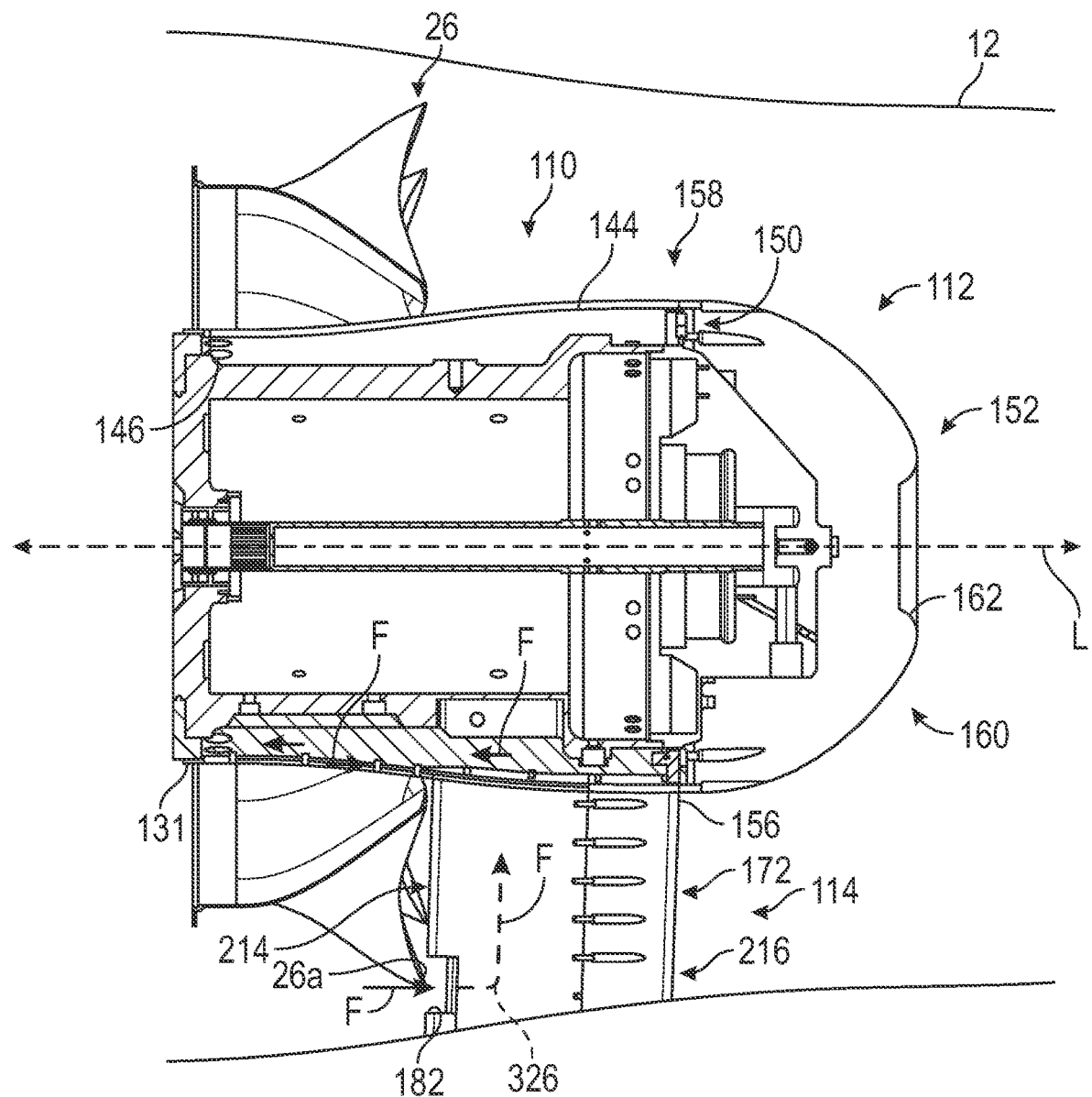
FIG. 10 is a cross-sectional view of the system and a portion of the gas turbine engine taken along line 10-10 of FIG. 2.

In this example, with reference to FIG. 9, the aft bulkhead 150 generally defines a plurality of recesses 154 and a plurality of tabs 156, which are arranged about a perimeter of the aft bulkhead 150. Each recess 154 is shaped to receive a respective one of the outlet ports 136, and each tab 156 is associated with a respective at least one airfoil 114. Each tab 156 cooperates with the coupling flanges 148a-148b of the shields 110a-110c to couple the shields 110a-110c to the aft bulkhead 150. In addition, in one example, two of the tabs 156a, 156b define at least one bore, which enables a conduit, tube or hose associated with the electric machine 102 to pass into the centerbody 152. For example, the tabs 156a, 156b may define two bores that each enable a conduit, tube or hose to pass into the centerbody 152. In these instances, a split seal 149 (FIG. 4) may be coupled to the aft bulkhead 150 to allow for sealing about the bores associated with the tabs 156a, 156b. With reference to FIG. 10, the tabs 156 of the aft bulkhead 150 also serve to fluidly isolate the first fluid passage 131 from the second fluid passage 144. As will be discussed, by fluidly isolating the first fluid passage 131 from the second fluid passage 144, the aft bulkhead 150 inhibits the cooling fluid from flowing aft or towards the second shield end 122, 622, and forces the cooling fluid to flow forward to the inlet ports 146, which provides cooling along the perimeter 102c of the electric machine 102 from the aft end 102b to the forward end 102a.

The centerbody 152 is hemispherical and hollow, and includes a first centerbody end 158 opposite a second centerbody end 160. The first centerbody end 158 is coupled to the second shield end 122, 622 of the shields 110a-110c, 610a-610c. The first centerbody end 158 has a diameter that is different and greater than a diameter of the second centerbody end 160 to direct the cooling fluid from the shields 110a-110c, 610a-610c to the second centerbody end 160. The second centerbody end 160 defines a central bore 162 along the longitudinal axis L. The central bore 162 is in fluid communication with the outlet ports 136, 636 and exhausts the cooling fluid from the system 100 into the tailpipe 28.

With reference back to FIG. 3, the at least one airfoil 114 includes a plurality of airfoils, including, but not limited to a pair of electrical routing airfoils 170 and a cooling airfoil 172. In this example, with reference to FIG. 9, the airfoils 170, 172 are substantially evenly spaced apart about the perimeter 102c of the electric machine 102. The cooling airfoil 172 is coupled to the shields 110a-110c, 610a-610c so as to extend substantially perpendicular to the longitudinal axis L, while the electrical routing airfoils 170 are coupled to the shields 110a-110c, 610a-610c so as to extend substantially oblique to the longitudinal axis L. Generally, as shown in FIG. 9, each of the airfoils 170, 172 is positioned between a pair of crests 26a of the mixer lobe 26 and is aligned with a trough 26b of the mixer lobe 26. The mixer lobe 26 includes a plurality of the crests 26a, which alternate with a plurality of troughs 26b about a perimeter of the mixer lobe 26. Generally, the shape between crests 26a and the troughs 26b follow a sine wave. By positioning each of the airfoils 170, 172 between a pair of the crests 26a and aligned with the trough 26b, a maximum amount of bypass cooling fluid from the outer bypass duct 24 (FIG. 2), which is substantially cooler than the core gas flow, is able to reach an airfoil inlet 182 while minimizing the amount of core gas flow, which is hot, that may reach the airfoil inlet 182. It should be noted that the placement and orientation of the airfoils 170, 172 may vary based on a particular electric machine 102 coupled to the gas turbine engine 10.

Figure 11:
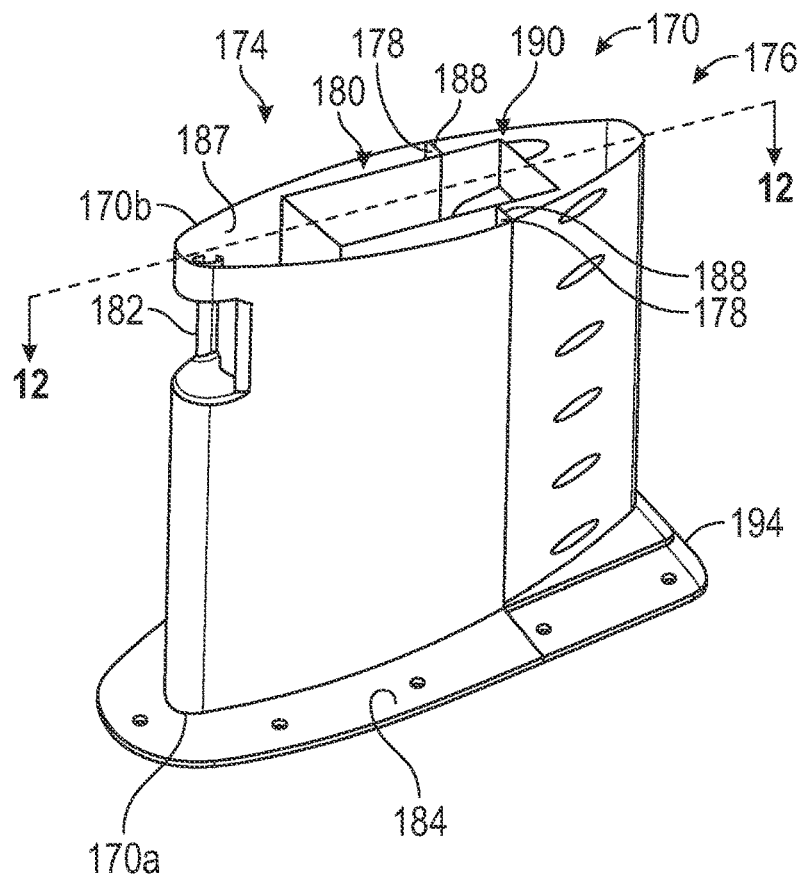
FIG. 11 is a perspective view of an electrical routing airfoil associated with the system.

With reference to FIG. 11, one of the electrical routing airfoils 170 is shown in greater detail. In this example, each of the electrical routing airfoils 170 includes a first routing airfoil half 174 and a second routing airfoil half 176, which enables an electrical component to be easily inserted within the electrical routing airfoil 170 and serviced, as needed. The first routing airfoil half 174 includes a pair of first coupling walls 178, a first conduit half 180, the airfoil inlet 182, and a first mounting flange 184. The first coupling walls 178 are defined to extend from an interior surface of the first routing airfoil half 174 at opposed sides of the interior surface at a trailing end of the first routing airfoil half 174. The first coupling walls 178 define a plurality of bores. Each of the bores receives a respective mechanical fastener, such as a screw, bolt or the like, to couple the first routing airfoil half 174 to the second routing airfoil half 176.

Figure 12:
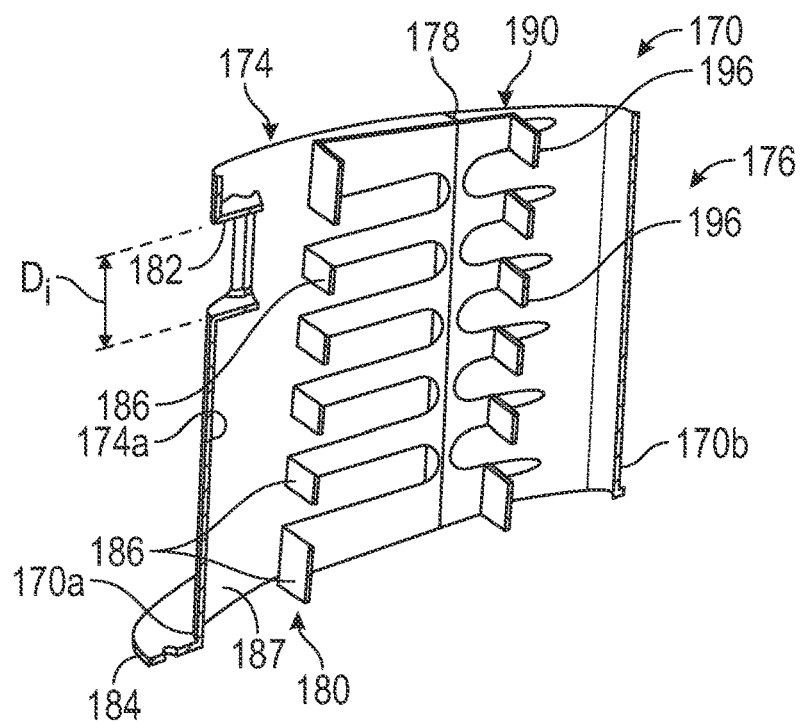
FIG. 12 is a cross-sectional view of the electrical routing airfoil of FIG. 11, taken along line 12-12 of FIG. 11.

With reference to FIG. 12, the first conduit half 180 is substantially U-shaped, and in this example, the first conduit half 180 is integrally formed or is connected with the first coupling walls 178 such that the first conduit half 180 is defined within an interior of the electrical routing airfoil 170 between the first coupling walls 178. The first conduit half 180 includes a plurality of first slots 186, which are spaced apart along a length of the first conduit half 180 from the first end 170a to the second end 170b. As will be discussed, the first slots 186 enable the cooling fluid, such as air, to flow over the electrical component received within the first conduit half 180.

Figure 13:
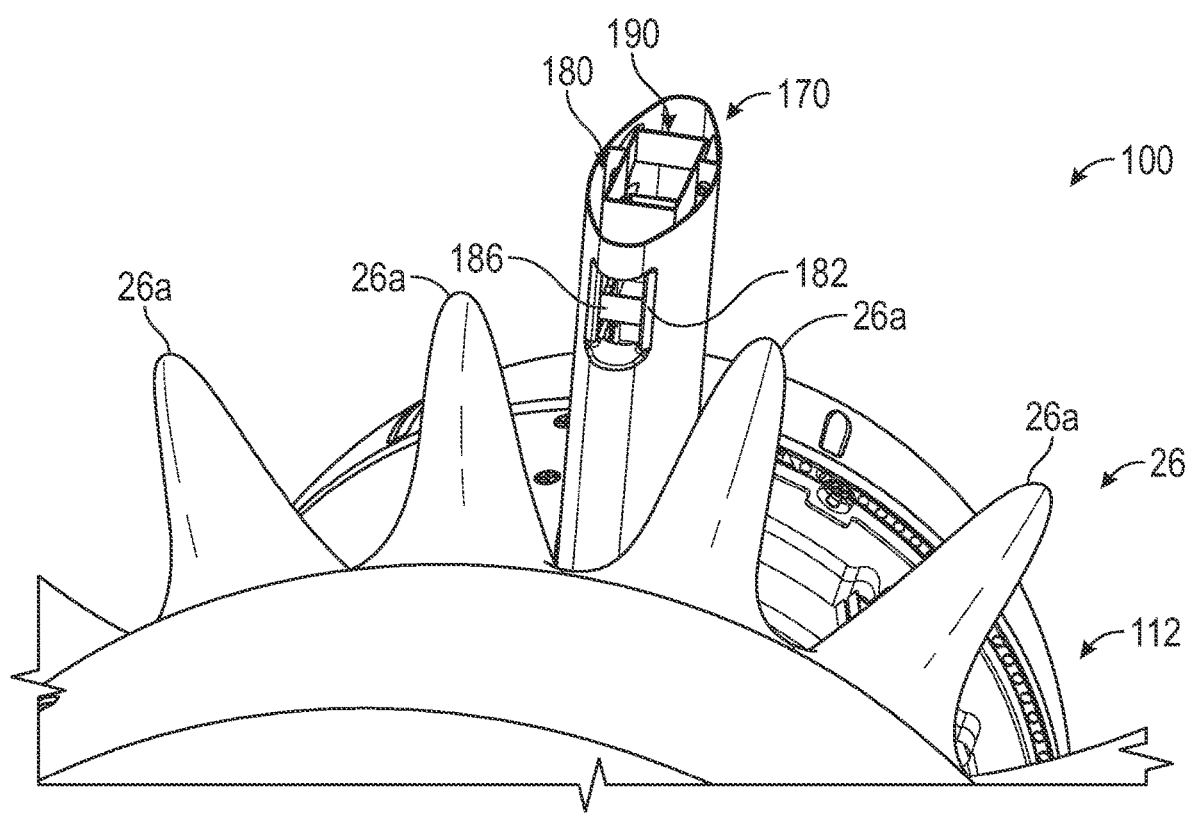
FIG. 13 is a forward perspective view of a portion of the system and the gas turbine engine.

The airfoil inlet 182 is defined at a leading edge of the electrical routing airfoil 170, with the leading edge opposite the trailing edge. The airfoil inlet 182 is substantially rectangular, and extends radially for a distance Di. The distance Di is predetermined to cooperate with the at least one aerodynamic support 116, as will be discussed. The airfoil inlet 182 is defined through an exterior surface of the first routing airfoil half 174 and is in communication with the interior of the electrical routing airfoil 170. The exterior surface of the first routing airfoil half 174 is substantially smooth, and may be contoured. Generally, with reference to FIG. 13, the airfoil inlet 182 enables the cooling fluid from the outer bypass duct 24 (FIG. 2) to enter into the interior of the electrical routing airfoil 170, where it may be used to cool the electrical component before exiting into the first fluid passage 131 (FIG. 10). As will be discussed, a channel 187 is defined between a surface 174a opposite the leading edge of the first routing airfoil half 174 and the first conduit half 180, which receives a portion of the at least one aerodynamic support 116 therethrough.

With reference back to FIG. 11, the first mounting flange 184 is defined at a first end 170a of the electrical routing airfoil 170, which is opposite a second end 170b of the electrical routing airfoil 170. The first mounting flange 184 extends outwardly from the first end 170a and about the perimeter of the first routing airfoil half 174. The first mounting flange 184 is shaped and sized to cooperate with the second coupling portion 142 of the shields 110a-110c, 610a-610c to couple the electrical routing airfoil 170 to the respective one of the shields 110a-110c, 610a-610c. The first mounting flange 184 defines a plurality of bores, which are sized and positioned to be coaxially aligned with respective ones of the bores of the second coupling portion 142 of the respective shields 110a-110c, 610a-610c. The first end 170a of the electrical routing airfoil 170 is open and is in fluid communication with the first fluid passage 131 to enable the cooling fluid from the airfoil inlet 182 to flow into the first fluid passage 131. The second end 170b of the electrical routing airfoil 170 is open to enable the electrical component to exit the electrical routing airfoil 170.

The second routing airfoil half 176 includes a pair of second coupling walls 188, a second conduit half 190, and a second mounting flange 194. The second coupling walls 188 are defined to extend from an interior surface of the second routing airfoil half 176 at opposed sides of the interior surface at a second leading end of the second routing airfoil half 176. The second coupling walls 188 define a plurality of bores. Each of the bores is coaxially aligned with a bore of a respective one of the first coupling walls 178 to receive the mechanical fastener to couple the first routing airfoil half 174 to the second routing airfoil half 176. In this example, each bore associated with the second coupling walls 188 includes a respective insertion guide defined on an exterior of the second routing airfoil half 176 to assist in inserting the mechanical fastener. The exterior surface of the second routing airfoil half 176 is otherwise substantially smooth, and may be contoured.

With reference to FIGS. 11 and 12, the second conduit half 190 is substantially U-shaped, and in this example, the second conduit half 190 is integrally formed or is connected with the second coupling walls 188 such that the second conduit half 190 is defined within an interior of the electrical routing airfoil 170 between the second coupling walls 188. The second conduit half 190 includes a plurality of second slots 196, which are spaced apart along a length of the second conduit half 190 from the first end 170a to the second end 170b. The second slots 196 are aligned with the first slots 186 to provide a substantially continuous flow passage along the electrical component received within the first conduit half 180 and the second conduit half 190.

With reference back to FIG. 11, the second mounting flange 194 is defined at the first end 170a of the electrical routing airfoil 170, which is opposite the second end 170b of the electrical routing airfoil 170. The second mounting flange 194 extends outwardly from the first end 170a and about the perimeter of the second routing airfoil half 176. The second mounting flange 194 is shaped and sized to cooperate with the second coupling portion 142 of the shields 110a-110c, 610a-610c to couple the electrical routing airfoil 170 to the respective one of the shields 110a-110c, 610a-610c. The second mounting flange 194 defines a plurality of bores, which are sized and positioned to be coaxially aligned with respective ones of the bores of the second coupling portion 142 of the respective shields 110a-110c, 610a-610c. The second mounting flange 194 cooperates with the first mounting flange 184 to couple the electrical routing airfoil 170 to the shields 110a-110c, 610a-610c.

The first conduit half 180 of the first routing airfoil half 174 cooperates with the second conduit half 190 of the second routing airfoil half 176 to define a conduit 200 that receives the electrical component associated with the electric machine 102. The conduit 200 is spaced apart from the leading edge of the electrical routing airfoil 170. In this example, with reference to FIG. 14, the electrical component is a plurality of flat flexible stranded power cables 202, which are each coupled to one of a pair of rectifiers 204. In one example, with additional reference to FIG. 15, a first cable end 202a of each of the flat flexible stranded power cables 202 is coupled to an end connector 206 associated with each post on a motor of the electric machine 102, and an opposite second cable end 202b is coupled to a respective one of the rectifiers 204. In FIG. 15, the shields 110a-110c, 610a-610c are removed for clarity. In this example, one of the rectifiers 204 is placed on each side of a mirror plane of the electrical routing airfoil 170 and outside of the bypass flow from the outer bypass duct 24 (FIG. 2). The rectifiers 204 are orientated to inhibit or minimize the twisting of the flat flexible stranded power cables 202, and convert the alternating current (AC) generated by the electric machine 102 to direct current (DC) for use by the vehicle 12 (FIG. 1). Generally, two sets of flat flexible stranded power cables 202 run to the end connectors 206, and the end connectors 206 are arcuate or curved to minimize any twisting of the flat flexible stranded power cables 202 and to keep the flat flexible stranded power cables 202 the same length. By providing the flat flexible stranded power cables 202 with the same length, the flat flexible stranded power cables 202 carry current evenly, which minimizes temperature differences between the flat flexible stranded power cables 202. The shorter length of the flat flexible stranded power cables 202 also reduces losses.

Figure 14:
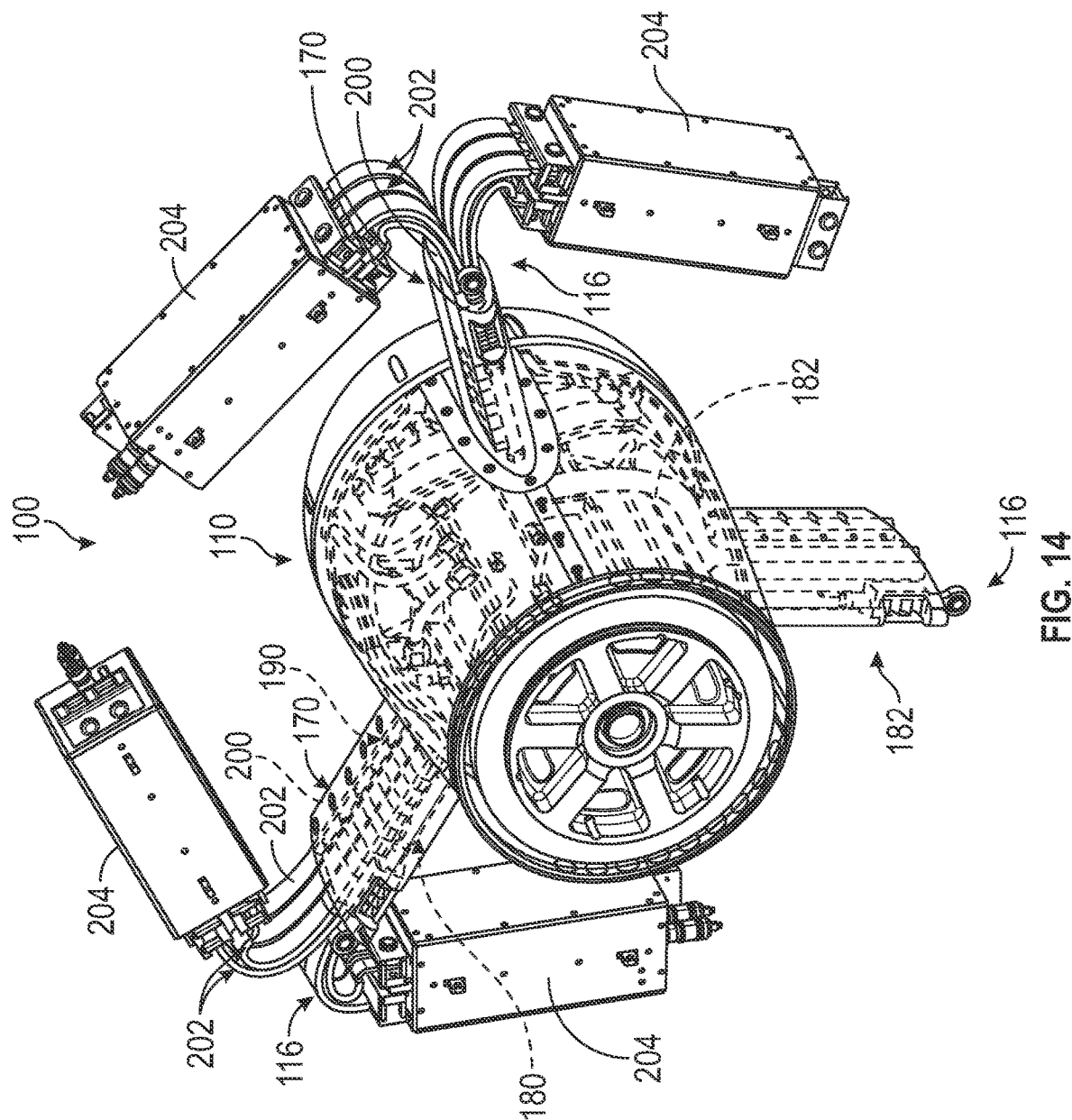
FIG. 14 is a forward perspective view that illustrates a routing of electrical components associated with the electric machine through the system.
Figure 15:
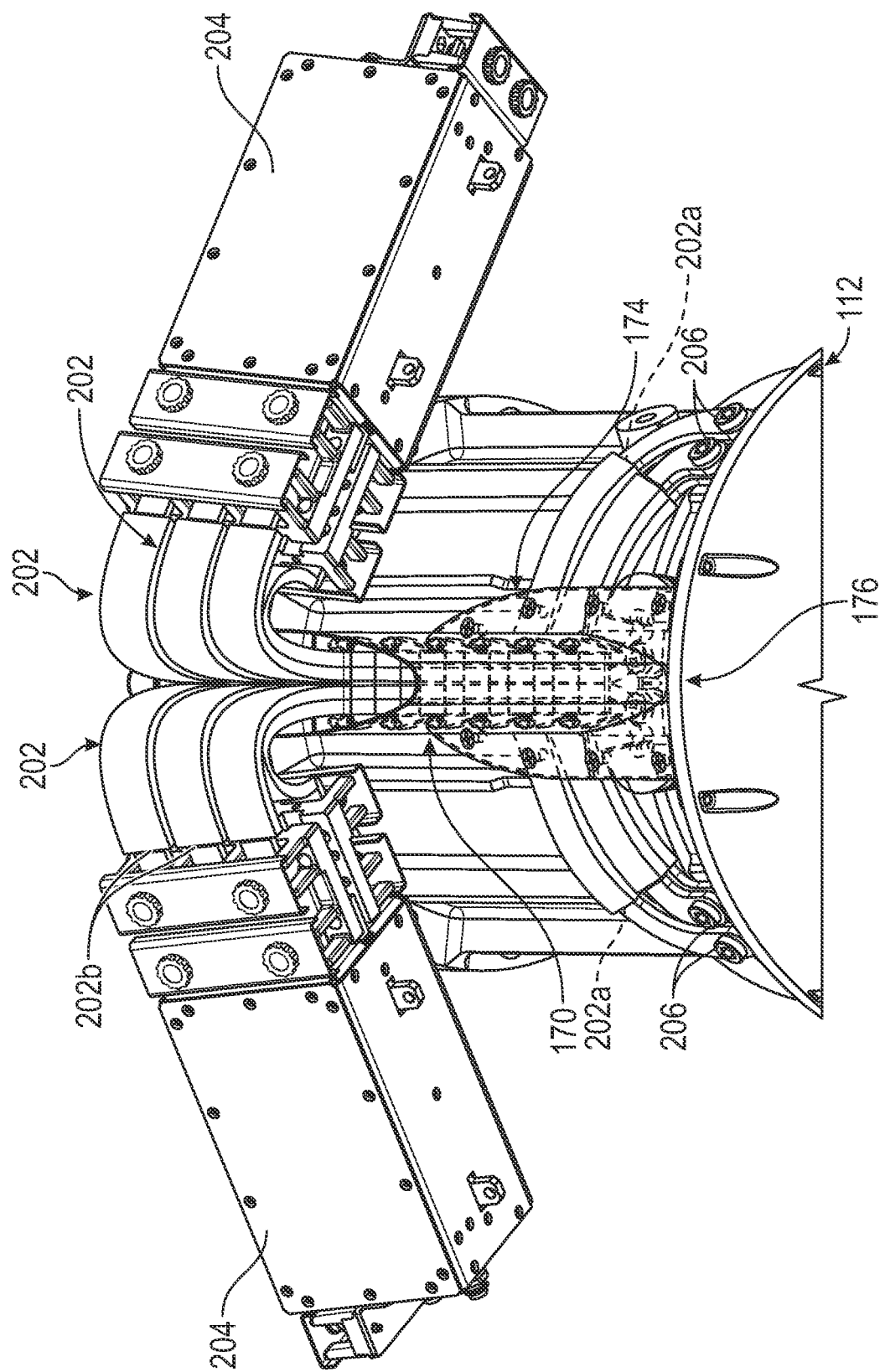
FIG. 15 is a detail aft view of the routing of the electrical components through an electrical routing airfoil of the system.

With reference to FIG. 14, the conduit 200 ensures that the routing of the flat flexible stranded power cables 202 is substantially symmetric about a center plane of the electric machine 102, and also provides cooling to the flat flexible stranded power cables 202 via the slots 186, 196 defined through the conduit 200 that are in fluid communication with the airfoil inlet 182 to receive the cooling fluid. In addition, by providing the first routing airfoil half 174 removably coupled to the second routing airfoil half 176, the second routing airfoil half 176 may be removed to provide access to all of the flat flexible stranded power cables 202 when the electric machine 102 is installed on the gas turbine engine 10. Further, the electrical routing airfoils 170 ensure the close proximity of the rectifiers 204 to the electric machine 102, while shielding the rectifiers 204 from the heat of the gas turbine engine 10 (FIG. 2). In certain instances, a cowl 205 (FIG. 2) may be coupled at the second end 170b, 172b of the airfoils 170, 172 so as to be positioned between the second ends 170b, 172b and the rectifiers 204 to shield the rectifiers 204 from the heat of the gas turbine engine 10.

Figure 16:
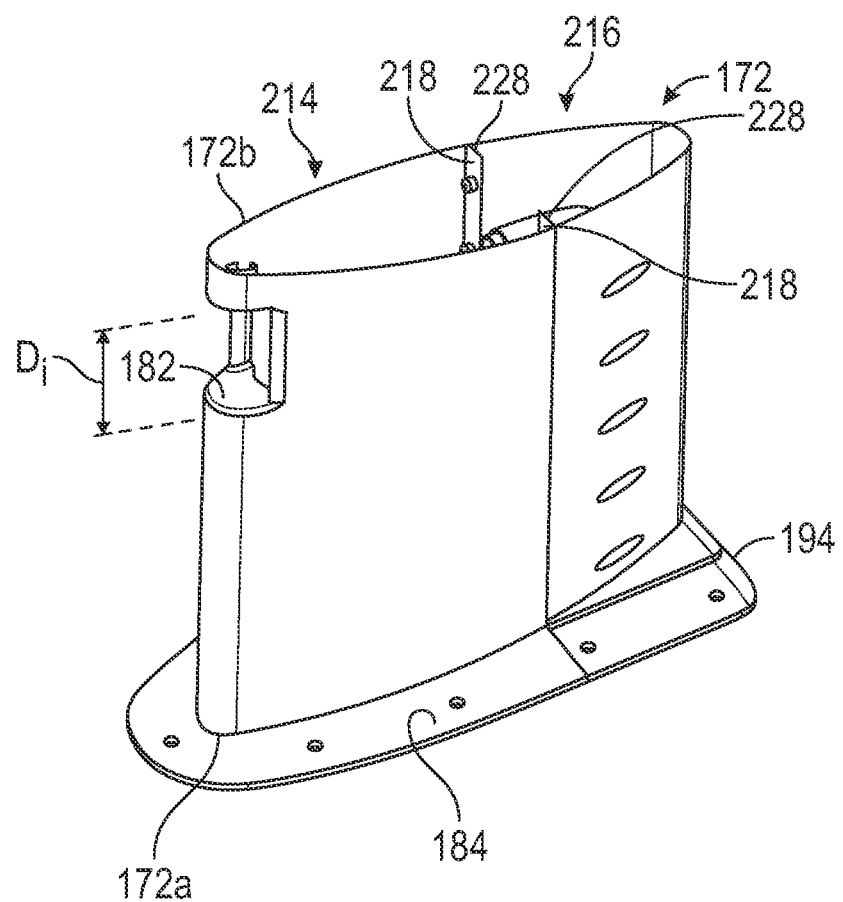
FIG. 16 is a perspective view of a cooling airfoil associated with the system.

With reference to FIG. 16, the cooling airfoil 172 is shown in greater detail. In this example, the cooling airfoil 172 includes a first cooling airfoil half 214 and a second cooling airfoil half 216, which enable servicing of the at least one aerodynamic support 116, as needed. In this example, the cooling airfoil 172 is hollow, and does not include the conduit 200. This enables other tubes, hoses, etc., such as those carrying oil or another cooling fluid to and from the electric machine 102, to pass through the cooling airfoil 172, if desired, to receive cooling from the cooling fluid received through the airfoil inlet 182. The first cooling airfoil half 214 includes a pair of first coupling walls 218, the airfoil inlet 182, and the first mounting flange 184. The first coupling walls 218 are defined to extend from an interior surface of the first coupling walls 218 at opposed sides of the interior surface at a trailing end of the first cooling airfoil half 214. The first coupling walls 218 define a plurality of bores. Each of the bores receives a respective mechanical fastener, such as a screw, bolt or the like, to couple the first cooling airfoil half 214 to the second cooling airfoil half 216.

The airfoil inlet 182 is defined at a leading edge of the cooling airfoil 172, with the leading edge opposite the trailing edge. The airfoil inlet 182 is substantially rectangular, and extends radially for the distance Di. The airfoil inlet 182 is defined through an exterior surface of the first cooling airfoil half 214 and is in communication with the interior of the cooling airfoil 172. Generally, the airfoil inlet 182 enables the cooling fluid from the outer bypass duct 24 (FIG. 2) to enter into the interior of the cooling airfoil 172 with minimal pressure loss, where it may be used to cool conduits, such as oil conduits, that pass through the interior of the cooling airfoil 172, for example, before exiting into the first fluid passage 131 (FIG. 10). The exterior surface of the first cooling airfoil half 214 is substantially smooth, and may be contoured.

With reference to FIG. 16, the first mounting flange 184 is defined at a first end 172a of the cooling airfoil 172, which is opposite a second end 172b of the cooling airfoil 172. The first mounting flange 184 extends outwardly from the first end 172a and about the perimeter of the first cooling airfoil half 214. The first mounting flange 184 is shaped and sized to cooperate with the second coupling portion 142 of the shields 110a-110c, 610a-610c to couple the cooling airfoil 172 to the respective one of the shields 110a-110c, 610a-610c. The first mounting flange 184 defines a plurality of bores, which are sized and positioned to be coaxially aligned with respective ones of the bores of the second coupling portion 142 of the respective shields 110a-110c, 610a-610c. The first end 172a of the cooling airfoil 172 is open and is in fluid communication with the first fluid passage 131 to enable the cooling fluid from the airfoil inlet 182 to flow into the first fluid passage 131. The second end 172b of the cooling airfoil 172 is open to enable tubes, hoses, etc. to exit the cooling airfoil 172.

With continued reference to FIG. 16, the second cooling airfoil half 216 includes a pair of second coupling walls 228 and the second mounting flange 194. The second coupling walls 228 are defined to extend from an interior surface of the second cooling airfoil half 216 at opposed sides of the interior surface at a second leading end of the second cooling airfoil half 216. The second coupling walls 228 define a plurality of bores. Each of the bores is coaxially aligned with a bore of a respective one of the first coupling walls 218 to receive the mechanical fastener to couple the first cooling airfoil half 214 to the second cooling airfoil half 216. In this example, each bore associated with the second coupling walls 228 includes a respective insertion guide defined on an exterior of the second cooling airfoil half 216 to assist in inserting the mechanical fastener. The exterior surface of the second cooling airfoil half 216 is otherwise substantially smooth, and may be contoured.

The second mounting flange 194 is defined at the first end 172a of the cooling airfoil 172, which is opposite the second end 172b of the cooling airfoil 172. The second mounting flange 194 extends outwardly from the first end 172a and about the perimeter of the second cooling airfoil half 216. The second mounting flange 194 is shaped and sized to cooperate with the second coupling portion 142 of the shields 110a-110c, 610a-610c to couple the cooling airfoil 172 to the respective one of the shields 110a-110c, 610a-610c. The second mounting flange 194 defines a plurality of bores, which are sized and positioned to be coaxially aligned with respective ones of the bores of the second coupling portion 142 of the respective shields 110a-110c, 610a-610c.

The second mounting flange 194 cooperates with the first mounting flange 184 to couple the cooling airfoil 172 to the shields 110a-110c, 610a-610c.

Figure 17:
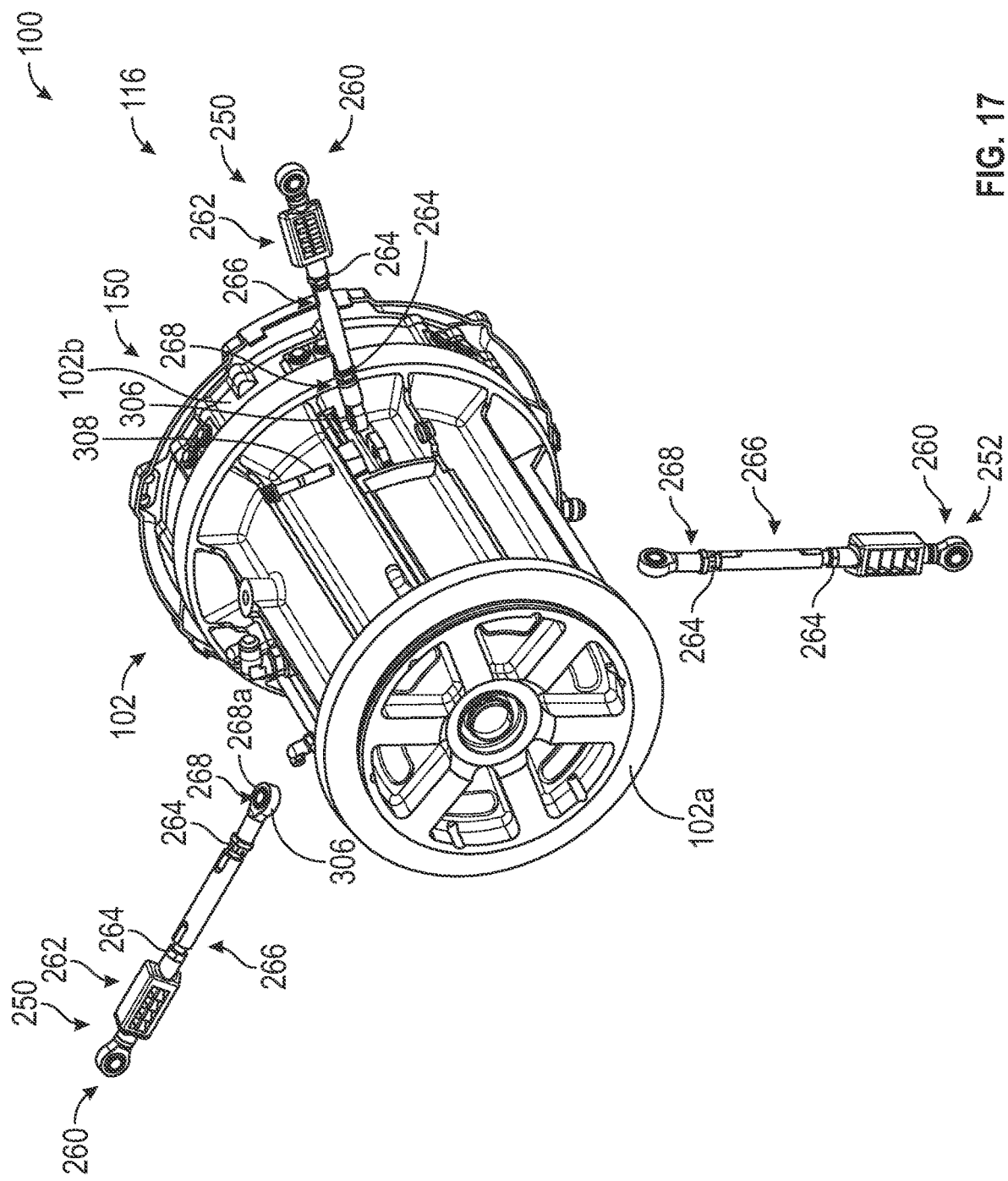
FIG. 17 is a forward perspective view of at least one aerodynamic support exploded from the electric machine.

With reference back to FIG. 14, the at least one aerodynamic support 116 couples the electric machine 102 to the gas turbine engine 10. In one example, the at least one aerodynamic support 116 includes three aerodynamic supports, a pair of first supports 250 and a second support 252 (FIG. 17). The supports 250, 252 may be composed of metal or metal alloy, and may be cast, forged, additively manufactured, etc. Generally, with additional reference to FIG. 17, the first supports 250 are coupled to the electric machine 102 so as to be received through the electrical routing airfoils 170, while the second support 252 is coupled to the electric machine 102 so as to be received through the cooling airfoil 172. In FIG. 17, the electric machine 102 is shown with the first supports 250 and the second support 252, and the shields 110a-110c, 610a-610c, the aft assembly 112 and the airfoils 170, 172 have been removed for clarity. Each of the first supports 250 include a first rod end 260, a first aerodynamic part 262, a pair of jam nuts 264, a rod 266 and a second rod end 268. One of the jam nuts 264 is coupled between the rod 266 and the second rod end 268, and the other one of the jam nuts 264 is coupled between the rod 266 and the first aerodynamic part 262.

The first rod end 260 is coupled to the gas turbine engine 10. In one example, with reference to FIG. 18, the first rod end 260 includes a spherical ball bearing 270, which is received within a bore 260a defined at the first rod end 260. The spherical ball bearing 270 receives a mechanical fastener, such as a bolt, to couple the first support 250 to the gas turbine engine 10. The first rod end 260 also includes a post 272 that is coupled to a first counterbore 274 associated with the first aerodynamic part 262. The post 272 may be coupled to the first counterbore 274 via a plurality of threads, adhesives, press-fit, mechanical fasteners, etc.

The first aerodynamic part 262 includes the first counterbore 274, at least one or a plurality of turning vanes 276, a splitter 278, and a second counterbore 280. The first counterbore 274 is defined at a first end 262a of the first aerodynamic part 262, which is opposite a second end 262b of the first aerodynamic part 262. The plurality of turning vanes 276 are defined through a body 282 of the first aerodynamic part 262. The body 282 extends from the first counterbore 274 to the second counterbore 280. The body 282 of the first aerodynamic part 262 is shaped to be received within the channel 187 defined within the electrical routing airfoil 170. In one example, with reference to FIG. 14, the body 282 extends for at least the distance Di such that the body 282 is positioned within and aligned with the airfoil inlet 182.

Figure 18:
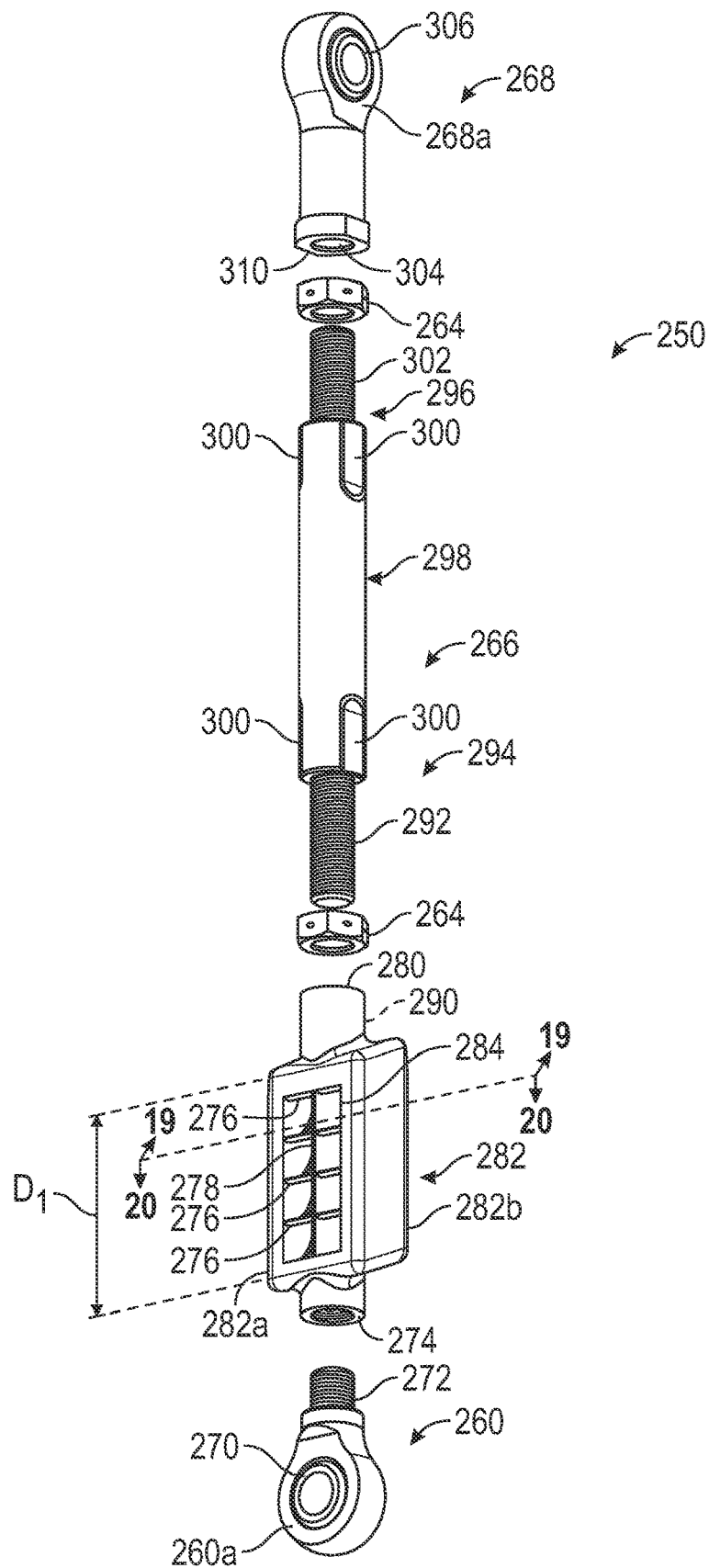
FIG. 18 is an exploded perspective view of a first support associated with the electric machine.
Figure 19:
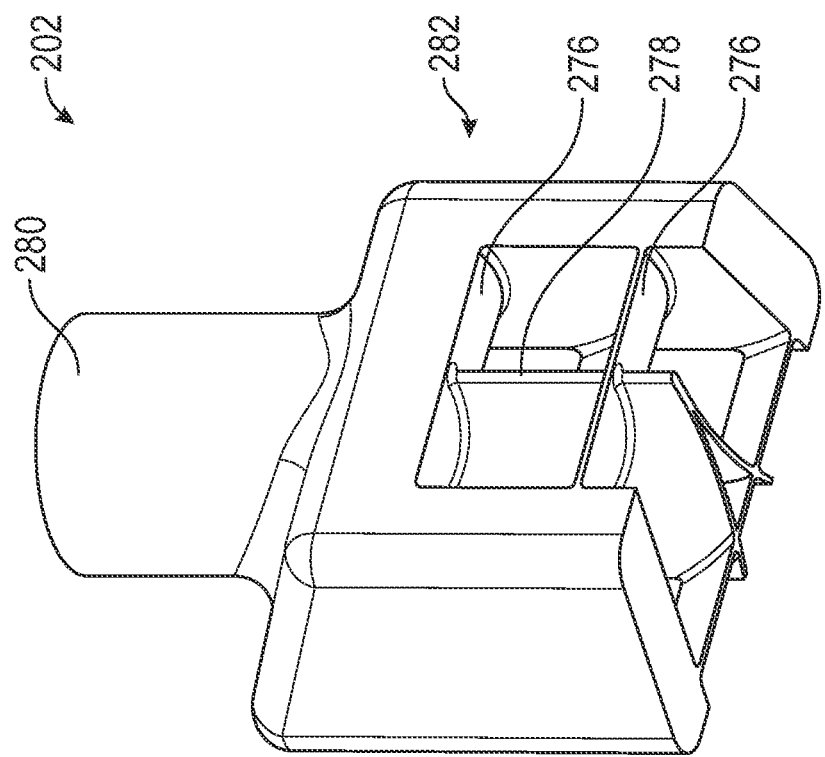
FIG. 19 is a cross-sectional view of an aerodynamic part associated with the first support, taken along 19-19 of FIG. 18.

With reference back to FIG. 18, the body 282 defines an opening 284. The opening 284 has a width along a leading end 282a (the inlet) that is different and less than a width of the opening 284 at a trailing end 282b (the outlet) of the body 282 such that the opening 284 diffuses the cooling fluid as it passes through the body 282. By diffusing the cooling fluid as it passes through the body 282, the first aerodynamic part 262 reduces a pressure loss of the cooling fluid. The first aerodynamic part 262 includes four turning vanes 276, in this example, but the first aerodynamic part 262 may include any number of turning vanes 276. With reference to FIG. 19, each of the turning vanes 276 is curved towards the second counterbore 280 to direct the cooling fluid toward the first end 170a of the electrical routing airfoil 170. The turning vanes 276 may have any predetermined curvature to direct or the cooling fluid flow from the airfoil inlet 182 towards the first end 170a of the electrical routing airfoil 170. Thus, generally, the body 282 of the first aerodynamic part 262 is positioned at or proximate the leading edge of the electrical routing airfoil 170 and enables the cooling fluid flow through the airfoil inlet 182 to pass through the first support 250 and be redirected toward the first end 172a of the cooling airfoil 172.

Figure 20:
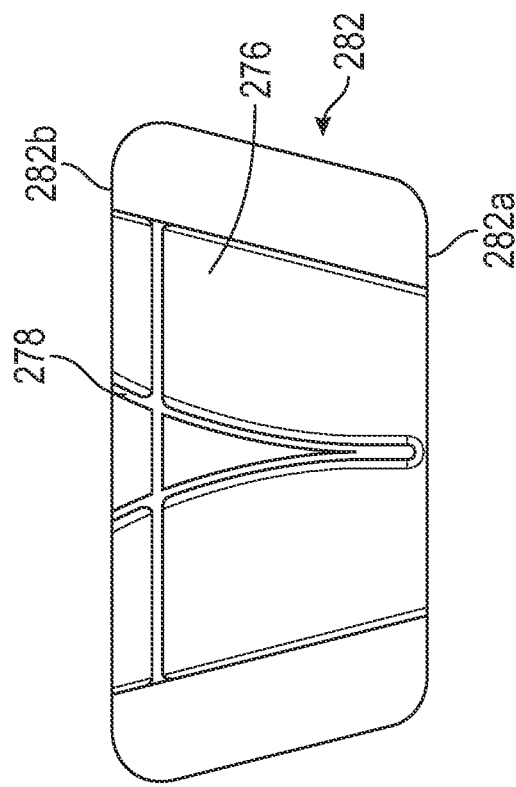
FIG. 20 is a cross-sectional view of the aerodynamic part associated with the first support, taken along 20-20 of FIG. 18.

The splitter 278 is defined to extend from the leading end 282a of the body 282 to the trailing end 282b, as shown in FIG. 20. The splitter 278 separates the cooling fluid flow into a first, left airflow and a second, right airflow, which assists in directing the cooling fluid around the flat flexible stranded power cables 202 received within the conduit 200 of the electrical routing airfoil 170. In one example, the splitter 278 is substantially V-shaped, however, the splitter 278 may have any desired shape, such as planar, to separate or split the cooling fluid flow through the body 282. Although one splitter 278 is shown for each of the turning vanes 276, it should be noted that multiple splitters may be employed, if desired. Further, while each turning vane 276 is shown and described as being intersected by a single central splitter 278 that extends along a length of the opening 284, one or more of the turning vanes 276 may include a splitter. Generally, the splitter 278 intersects the turning vanes 276 to separate or split the flow through the opening 284.

With reference back to FIG. 18, the second counterbore 280 is coupled to the rod 266. In one example, the second counterbore 280 includes a plurality of first threads 290, which matingly or threadably engage with a plurality of first rod threads 292 of the rod 266. In one example, the first threads 290 and the first rod threads 292 are each right-hand threads.

The rod 266 includes a first threaded end 294 opposite a second threaded end 296, and has a rod body 298 that extends between the first threaded end 294 and the second threaded end 296. The rod body 298 includes tool flats 300, such as wrench flats, at or proximate each of the first threaded end 294 and the second threaded end 296. The tool flats 300 enable a tool, such as a wrench, to grip the rod 266 and rotate the rod 266 as desired to increase or decrease a length of the first support 250. This provides fine adjustment to the position of the electric machine 102 after the electric machine 102 is coupled to the gas turbine engine 10. The first threaded end 294 includes the first rod threads 292 to couple to the first aerodynamic part 262, and the second threaded end 296 includes a plurality of second rod threads 302 to matingly or threadably engage with a plurality of second threads 304 of the second rod end 268. In one example, the second threads 304 and the second rod threads 302 are each left-hand threads.

With additional reference to FIG. 17, the second rod end 268 is coupled to the electric machine 102. The second rod end 268 includes a spherical ball bearing 306, which is received within a bore 268a defined at the second rod end 268. The spherical ball bearing 306 receives a mechanical fastener, such as a bolt 308, to couple the first support 250 to the electric machine 102. With reference to FIG. 18, the second rod end 268 also includes a counterbore 310 that defines the second threads 304 to couple the second threaded end 296 to the second rod end 268.

Figure 21:
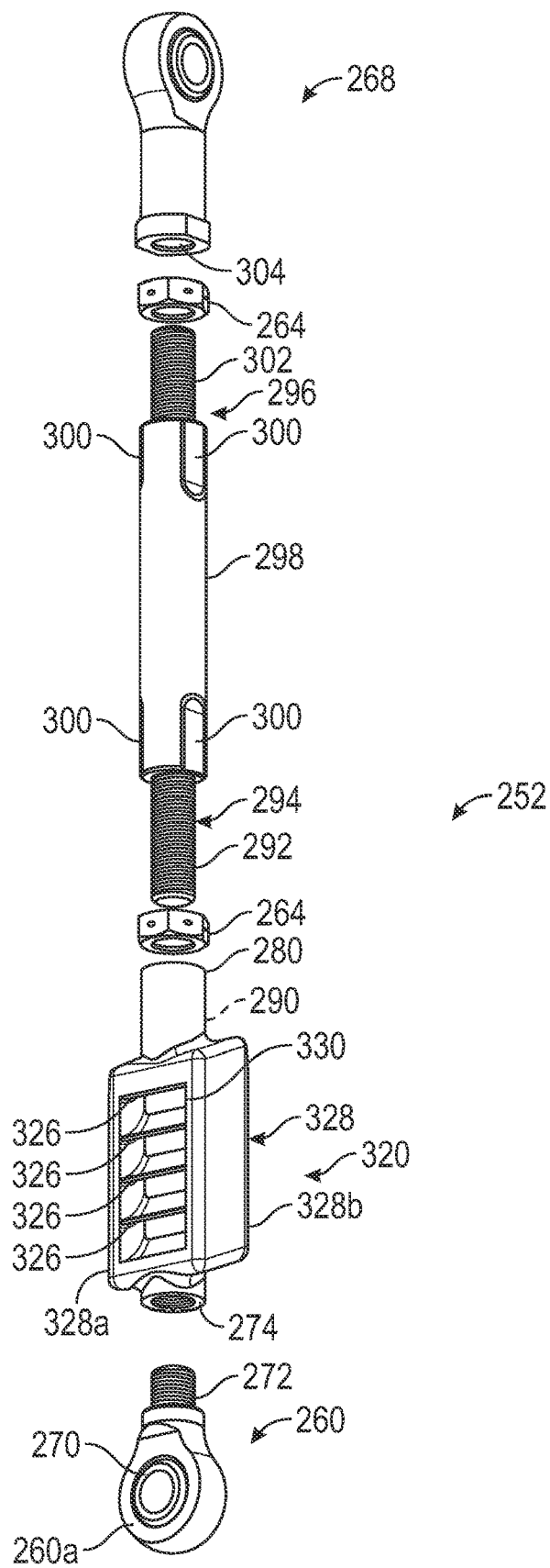
FIG. 21 is an exploded perspective view of a second support associated with the electric machine.

With reference to FIG. 21, the second support 252 includes the first rod end 260, a second aerodynamic part 320, the pair of jam nuts 264, the rod 266 and the second rod end 268. One of the jam nuts 264 is coupled between the rod 266 and the second rod end 268, and the other one of the jam nuts 264 is coupled between the rod 266 and the second aerodynamic part 320.

Figure 22:
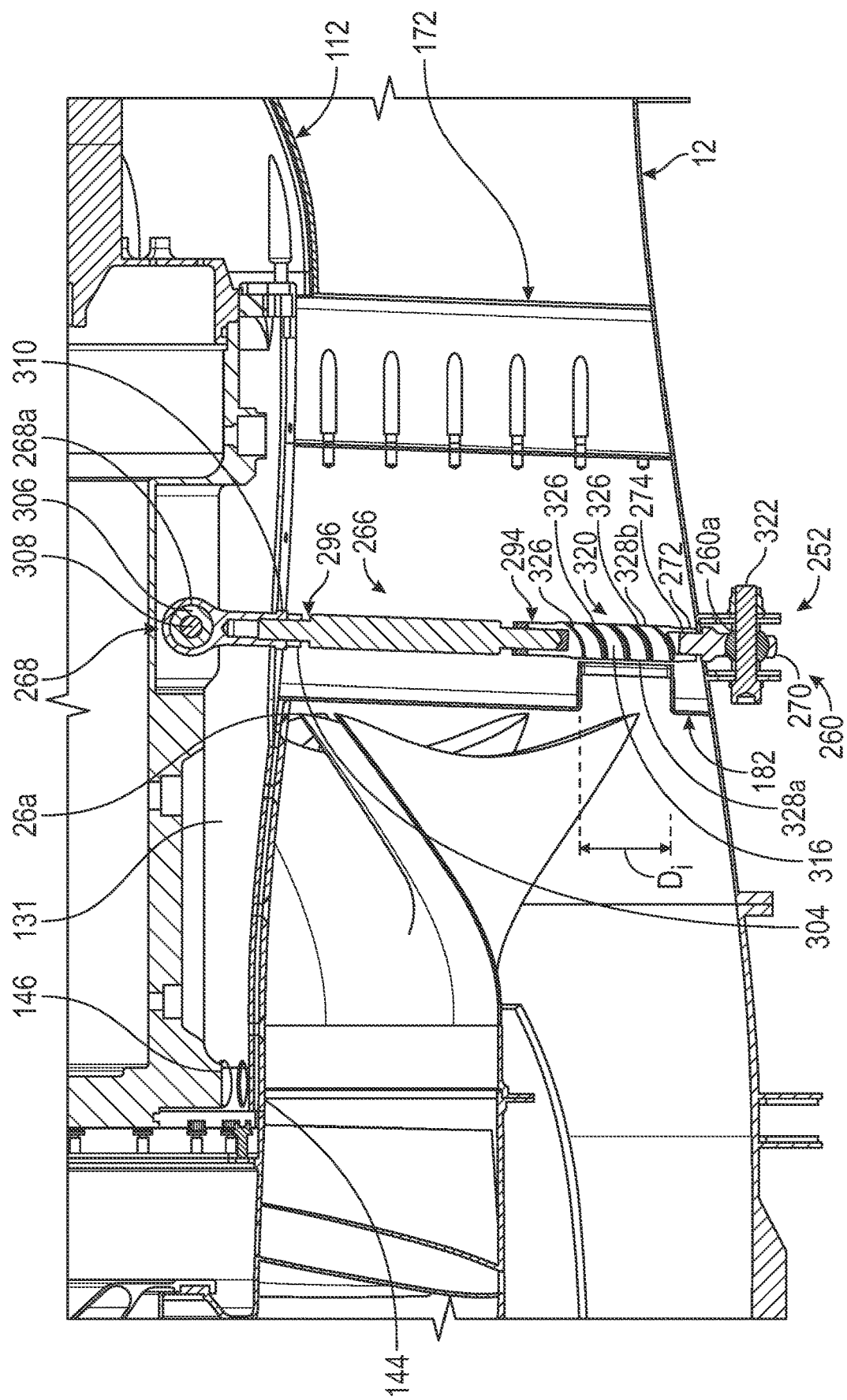
FIG. 22 is a cross-sectional view of the system and a portion of the gas turbine engine taken along line 22-22 of FIG. 2.

With reference to FIG. 22, the first rod end 260 is coupled to the gas turbine engine 10. The first rod end 260 includes the spherical ball bearing 270, which is received within the bore 260a. The spherical ball bearing 270 receives a mechanical fastener, such as a bolt 322, to couple the second support 252 to the gas turbine engine 10. The first rod end 260 also includes the post 272 that is coupled to the first counterbore 274 associated with the second aerodynamic part 320. The post 272 may be coupled to the first counterbore 274 via a plurality of threads, adhesives, press-fit, mechanical fasteners, etc.

The second aerodynamic part 320 includes the first counterbore 274, at least one or a plurality of turning vanes 326, and the second counterbore 280. The first counterbore 274 is defined at a first end 320a of the second aerodynamic part 320, which is opposite a second end 320b of the second aerodynamic part 320. The plurality of turning vanes 326 are defined through a body 328 of the second aerodynamic part 320. The body 328 extends from the first counterbore 274 to the second counterbore 280. The body 328 of the second aerodynamic part 320 is shaped to be received within the cooling airfoil 172. The body 328 extends for at least the distance Di such that the body 328 is positioned within and aligned with the airfoil inlet 182.

With reference back to FIG. 21, the body 328 defines an opening 330. The opening 330 has a width along a leading end 328a (the inlet) that is different and less than a width of the opening 330 at a trailing end 328b (the outlet) of the body 328 such that the opening 284 diffuses the cooling fluid as it passes through the body 328. By diffusing the cooling fluid as it passes through the body 328, the second aerodynamic part 320 reduces a turbulence of the cooling fluid. The second aerodynamic part 320 includes four turning vanes 326, in this example, but the second aerodynamic part 320 may include any number of turning vanes 326. With reference to FIG. 22, each of the turning vanes 326 is curved towards the second counterbore 280 to direct the cooling fluid toward the first end 172a of the cooling airfoil 172. The turning vanes 326 may have any predetermined curvature to direct or the cooling fluid flow from the airfoil inlet 182 towards the first end 172a of the cooling airfoil 172. Stated another way, the turning vanes 326 turn the cooling fluid from axial to radial, which enables the cooling fluid to reach the electric machine 102 easier. Thus, generally, the body 328 of the second aerodynamic part 320 is positioned at or proximate the leading edge of the cooling airfoil 172 and enables the cooling fluid flow through the airfoil inlet 182 to pass through the second support 252 and be redirected toward the first end 172a of the cooling airfoil 172.

With reference back to FIG. 21, the second counterbore 280 is coupled to the rod 266. In one example, the second counterbore 280 includes the first threads 290, which matingly or threadably engage with the first rod threads 292 of the rod 266. In one example, the first threads 290 and the first rod threads 292 are each right-hand threads.

The rod 266 includes the first threaded end 294 opposite the second threaded end 296, and has the rod body 298 that extends between the first threaded end 294 and the second threaded end 296. The rod body 298 includes the tool flats 300. The tool flats 300 enable a tool, such as a wrench, to grip the rod 266 and rotate the rod 266 as desired to increase or decrease a length of the second support 252. This provides fine adjustment to the position of the electric machine 102 after the electric machine 102 is coupled to the gas turbine engine 10. The first threaded end 294 includes the first rod threads 292 to couple to the second aerodynamic part 320, and the second threaded end 296 includes the second rod threads 302 to matingly or threadably engage with the second threads 304 of the second rod end 268. In one example, the second threads 304 and the second rod threads 302 are each left-hand threads.

With additional reference to FIG. 22, the second rod end 268 is coupled to the electric machine 102. The second rod end 268 includes the spherical ball bearing 306, which is received within the bore 268a. The spherical ball bearing 306 receives a mechanical fastener, such as the bolt 308, to couple the second support 252 to the electric machine 102. The second rod end 268 also includes a counterbore 310 that defines the second threads 304 to couple the second threaded end 296 to the second rod end 268.

In one example, with reference to FIGS. 2-4 and 14, in order to couple the electric machine 102 to the gas turbine engine 10, the aft bulkhead 150 is coupled to the electric machine 102. The first supports 250 and the second support 252 are coupled to the electric machine 102 and to the gas turbine engine 10. The first routing airfoil halves 174 and the second routing airfoil halves 176 are positioned about the flat flexible stranded power cables 202 such that the flat flexible stranded power cables 202 are received within the conduit 200, the respective first support 250 is received within the channel 187 and the first aerodynamic part 262 is aligned with the airfoil inlet 182. The first routing airfoil halves 174 are coupled to the second routing airfoil halves 176. The first cooling airfoil half 214 and the second cooling airfoil half 216 are positioned about the second support 252 such that the second aerodynamic part 320 is aligned with the airfoil inlet 182. The first cooling airfoil half 214 is coupled to the second cooling airfoil half 216. The shields 110a-110c, 610a-610c are coupled about the perimeter 102c of the electric machine 102, and the airfoils 170, 172 are coupled to the shields 110a-110c, 610a-610c at the respective second coupling portion 142. The centerbody 152 is coupled to the aft bulkhead 150.

With the system 100 coupled to the electric machine 102 and the gas turbine engine 10 such that the electric machine 102 is in line with the gas turbine engine 10 and downstream from the exhaust section 14, the system 100 provides cooling to the electric machine 102 during the operation of the gas turbine engine 10 and/or the vehicle 12. With reference to FIGS. 6, 10, 14 and 22, the cooling fluid F (fluid from the outer bypass duct 24) flows axially between the crests 26a and enters into the airfoil inlet 182. From the airfoil inlet 182, the cooling fluid F flows through the turning vanes 276, 326, which redirects the cooling fluid F radially, toward the first ends 170a, 172a. From the first ends 170a, 172a, the cooling fluid F flows into the first fluid passage 131. The cooling fluid F is inhibited from flowing aft by the aft bulkhead 150, and as pressure builds in the first fluid passage 131, the cooling fluid F absorbs heat from the electric machine 102 and flows toward the inlet ports 146 of the shields 110a-110c, 610a-610c. The cooling fluid F flows through the inlet ports 146 and into the second fluid passage 144, where the cooling fluid F flows aft and exits the shields 110a-110c, 610a-610c via the outlet ports 136, 636. From the outlet ports 136, 636, the cooling fluid F flows into the centerbody 152. The cooling fluid F flows through the central bore 162 of the centerbody 152 and exits with the rest of the exhaust fluid through the tailpipe 28.

Thus, the system 100 provides cooling to the electric machine 102 and the flat flexible stranded power cables 202 associated with the electric machine 102 during the operation of the gas turbine engine 10 and/or vehicle 12. By providing the airfoils 170, 172 with the airfoil inlet 182, the cooling fluid may be used to cool the flat flexible stranded power cables 202 and/or oil conduits prior to flowing to the shields 110a-110c, 610a-610c to extract heat from the electric machine 102. Further, the aerodynamic part 262, 320 of the supports 250, 252, respectively, enable cooling fluid to pass through the supports 250, 252, while redirecting the cooling fluid toward the first end 170a, 172a of the airfoils 170, 172 to enter into the first fluid passage 131. Generally, the supports 250, 252 comprise turnbuckles, which include the aerodynamic part 262, 320 that enable the cooling fluid to flow through the supports 250, 252. Thus, the supports 250, 252 assist in providing cooling for the electric machine 102, while also withstanding the tensile loads applied to the supports 250, 252 during static and dynamic loading and coupling the electric machine 102 to the gas turbine engine 10. The shape of the body 282, 328 of the aerodynamic part 262, 320 also reduces the turbulence of the cooling fluid flow. In addition, the conduit 200 defined by the airfoils 170, 172 reduces a twisting of the flat flexible stranded power cables 202 while also ensuring the rectifiers 204 are positioned to inhibit twisting.

Figure 22A:
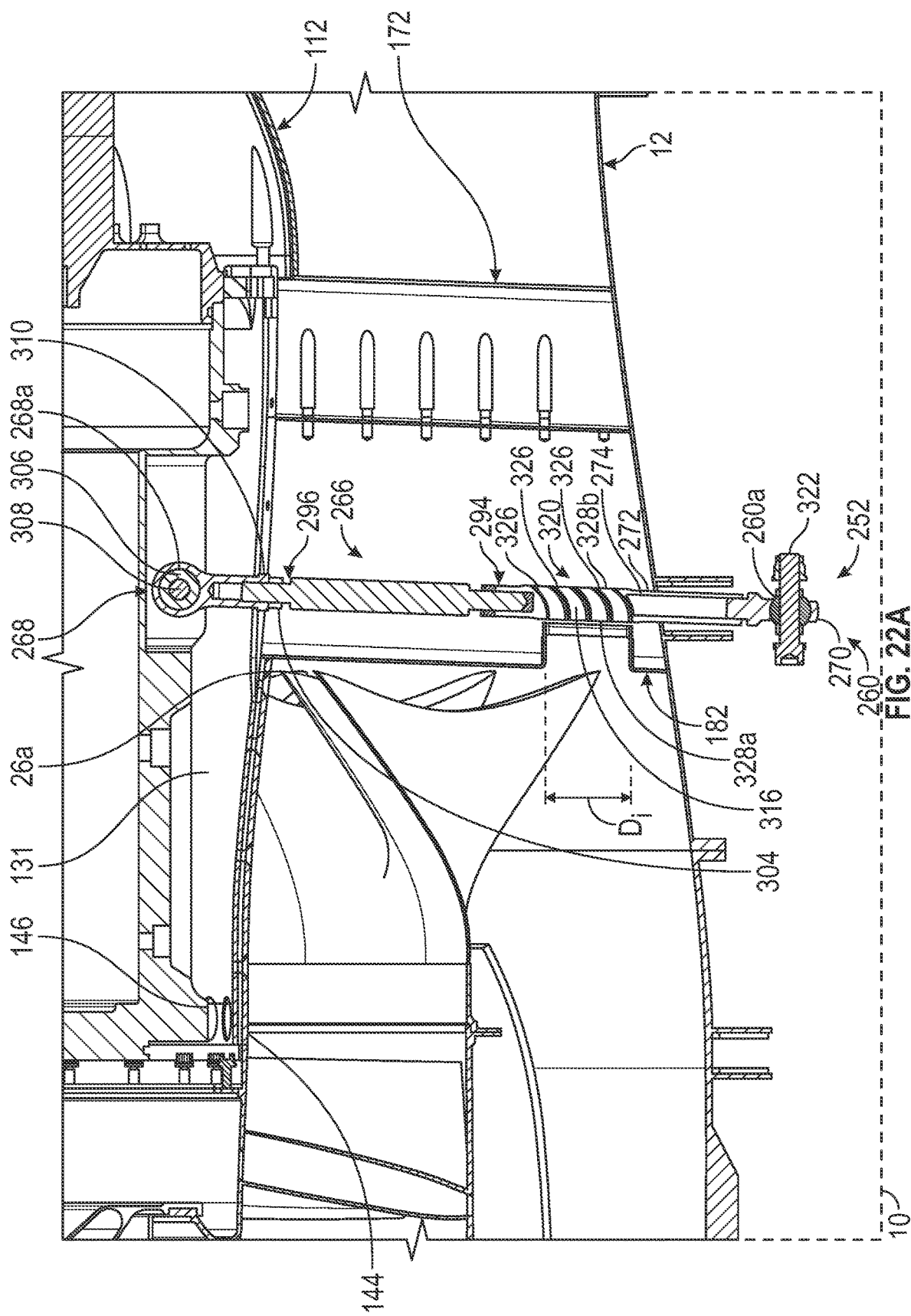
FIG. 22A is another exemplary cross-sectional view of the system and the portion of the gas turbine engine taken from the perspective of line 22-22 of FIG. 2, which illustrates the system coupling the electric machine to the vehicle.

In addition, it should be noted that while the electric machine 102 is referred to as being coupled to the gas turbine engine 10, in other embodiments, the electric machine 102 may be coupled to the vehicle 12. For example, with reference to FIG. 22A, in certain embodiments, the second support 252 may be elongated to couple to a mechanical fastener, such as a bolt 422, associated with the vehicle 12, for example, to couple the electric machine 102 to the vehicle 12.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for an electric machine associated with a gas turbine engine of a vehicle, comprising:
   a shield configured to be coupled to the electric machine, the shield including a first wall opposite a second wall with a flow passage defined between the first wall and the second wall, the first wall defining an inlet port at a first end that is opposite an outlet port defined between the first wall and the second wall at a second end, the inlet port and the outlet port in fluid communication with the flow passage; and
   an airfoil coupled to the shield proximate the second end to extend radially from the shield, the airfoil defining an airfoil inlet at a leading edge that is in fluid communication with an interior of the airfoil, the interior of the airfoil in fluid communication with the inlet port and the interior of the airfoil is configured to receive an aerodynamic support to couple the electric machine to the gas turbine engine.

2. The system of claim 1, wherein the aerodynamic support is positioned within the interior of the airfoil proximate the leading edge such that an opening included in the aerodynamic support is aligned with the airfoil inlet.

3. The system of claim 2, wherein the opening includes a turning vane that is configured to direct a cooling fluid flow from the airfoil inlet through the aerodynamic support and to redirect the cooling fluid flow radially toward the flow passage.

4. The system of claim 3, wherein the opening includes a splitter that intersects the turning vane.

5. The system of claim 2, wherein the aerodynamic support is a turnbuckle that includes the opening.

6. The system of claim 1, wherein the airfoil includes a conduit that is configured to receive an electrical component associated with the electric machine and the electric machine is oil cooled.

7. The system of claim 6, wherein the conduit includes a slot configured to receive a cooling fluid flow from the airfoil inlet to cool the electrical component.

8. The system of claim 1, wherein the shield is configured to be coupled to the electric machine to define a first flow passage, and the first flow passage is in fluid communication with the interior of the airfoil and the inlet port.

9. The system of claim 1, wherein the outlet port comprises a diffusion outlet port.

10. The system of claim 1, wherein the outlet port comprises a plurality of bores.

11. The system of claim 1, further comprising an aft bulkhead coupled to the second end of the shield and configured to inhibit a flow of a cooling fluid toward the second end of the shield.

12. The system of claim 1, further comprising a centerbody coupled to the second end of the shield, and the centerbody is in fluid communication with the outlet port.

13. A vehicle, comprising:
   a gas turbine engine that extends along a longitudinal axis, the gas turbine engine including a mixer lobe configured to mix a cooling fluid with exhaust gases;
   an electric machine coupled to the gas turbine engine by a system so as to extend along the longitudinal axis;
   the system including: a shield coupled to the electric machine to define a first flow passage, the shield including a first wall opposite a second wall with a second flow passage defined between the first wall and the second wall, the first flow passage in fluid communication with the second flow passage; and
   an airfoil coupled to the shield that defines an airfoil inlet at a leading edge that is in fluid communication with an interior of the airfoil, the interior of the airfoil in fluid communication with the first flow passage and an aerodynamic support received within the interior of the airfoil proximate the leading edge, the aerodynamic support configured to couple the electric machine to the gas turbine engine.

14. The vehicle of claim 13, wherein the shield further comprises an inlet port at a first end and an outlet port defined between the first wall and the second wall at a second end, the second end opposite the first end and the airfoil is coupled to the shield proximate the second end.

15. The vehicle of claim 13, wherein the mixer lobe includes a plurality of crests and a plurality of troughs that alternate about a perimeter of the mixer lobe, and the airfoil is positioned between a pair of crests of the plurality of crests and is aligned with a trough of the plurality of troughs to receive the cooling fluid at the airfoil inlet.

16. The vehicle of claim 13, wherein the electric machine is oil cooled, and the aerodynamic support includes an opening that is aligned with the airfoil inlet and configured to allow the cooling fluid to pass through the aerodynamic support into the interior of the airfoil.

17. The vehicle of claim 13, wherein the airfoil includes a conduit that is configured to receive an electrical component associated with the electric machine and the conduit is spaced apart from the leading edge.

18. The vehicle of claim 14, wherein the outlet port comprises a diffusion outlet port or a plurality of bores.

19. The vehicle of claim 14, further comprising an aft bulkhead coupled to the second end of the shield and configured to direct the cooling fluid toward the first end of the shield.

* * * * *